United States Patent [19]

Takahara et al.

[11] 4,063,286

[45] Dec. 13, 1977

[54] VIDEO DISC PLAYER

[75] Inventors: Ichiro Takahara, Kadoma; Tadahiko Yabu, Hirakata; Jihei Hujita, Neyagawa, all of Japan

[73] Assignee: Sanyo Electric Co., Ltd., Osaka, Japan

[21] Appl. No.: 648,629

[22] Filed: Jan. 13, 1976

[30] Foreign Application Priority Data

| Jan. 14, 1975 | Japan | 50-7126[U] |
| Jan. 14, 1975 | Japan | 50-7127[U] |
| Jan. 17, 1975 | Japan | 50-8935[U] |
| Jan. 20, 1975 | Japan | 50-9819[U] |
| July 17, 1975 | Japan | 50-88011 |

[51] Int. Cl.$^2$ .............................................. G11B 3/62
[52] U.S. Cl. ..................... 358/128; 274/9 B; 206/312; 360/133; 360/86
[58] Field of Search ............. 178/6.6 R, 6.6 DD; 179/100.4 R; 360/133, 86, 99, 97; 206/312; 274/9 B; 358/128

[56] References Cited

U.S. PATENT DOCUMENTS 3,899,181  8/1975  Dannert ............................ 360/133

Primary Examiner—Bernard Konick
Assistant Examiner—Alan Faber
Attorney, Agent, or Firm—Armstrong, Nikaido & Marmelstein

[57] ABSTRACT

A video disc player utilizable with a flexible foil-type information carrier disc adapted to be rotated at its center at a relatively high speed while hovering on a rotation-induced air cushion above a stationary platform. The video disc player has a table structure including the platform and a disc receiving chamber designed such that, even if the video disc is inserted thereinto together with a disc envelope accommodating the video disc therein, the disc is drawn out of the envelope and subsequently fed onto the platform and that the video disc, which has been resting on the platform, can be fed into the envelope as the empty envelope is inserted into the disc receiving chamber.

11 Claims, 20 Drawing Figures

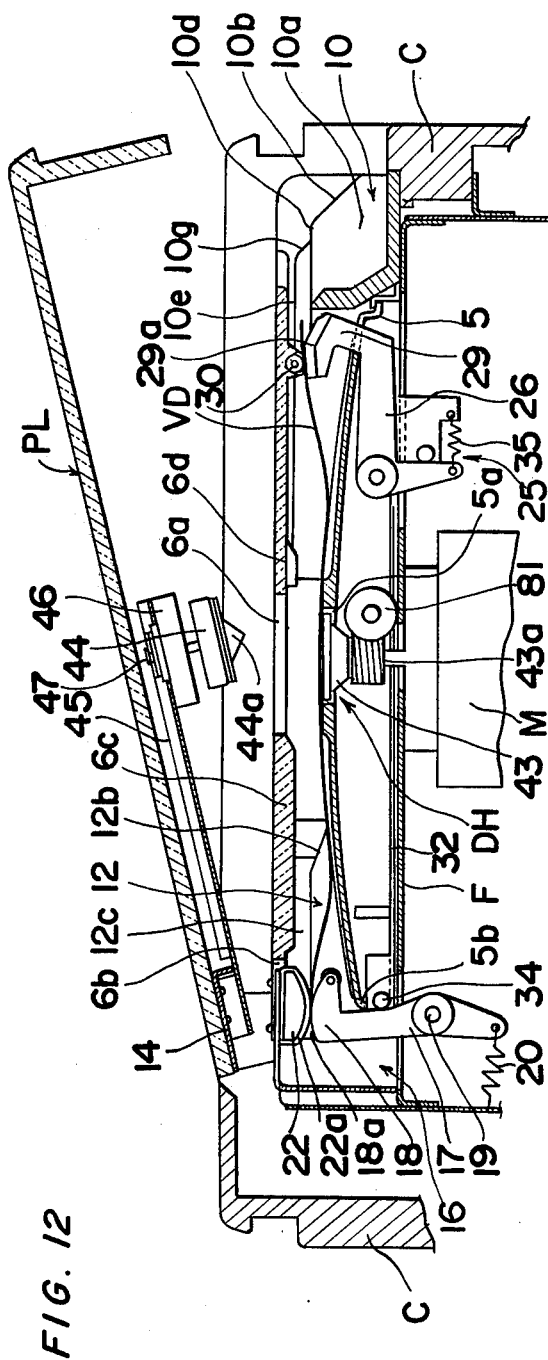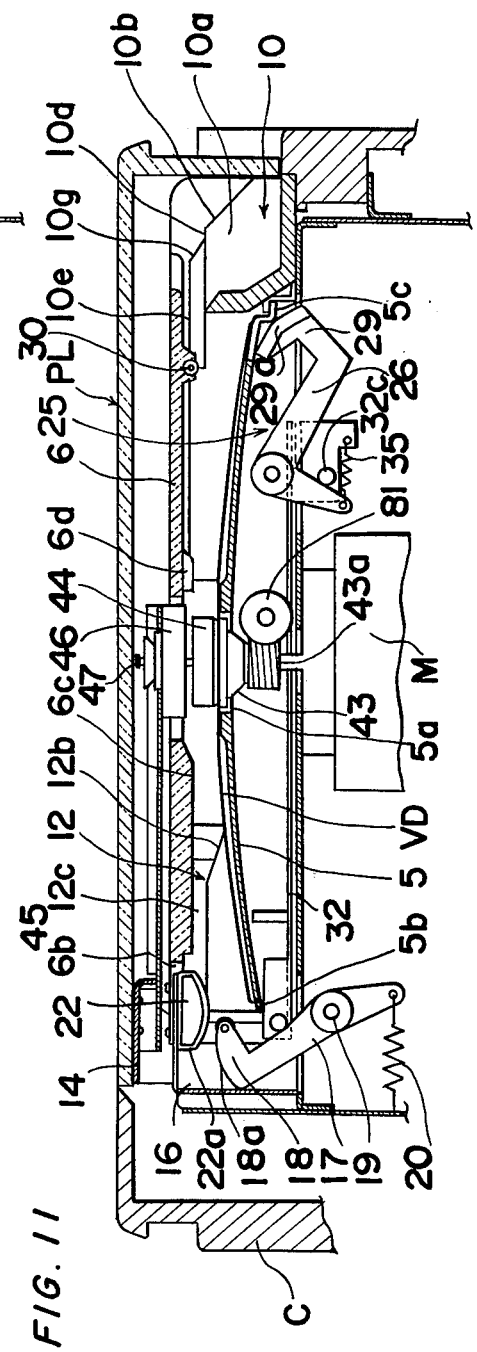
FIG. 12
FIG. 11

VIDEO DISC PLAYER

The present invention generally relates to a video disc player utilizing a flexible foil-type, information-storage record or disc. More particularly, the present invention relates to the video disc player having an apparatus for automatically loading and unloading a flexible foil-type, information-storage disc into and from a disc receiving chamber of the video disc player.

The video disc player to which the present invention pertains and which utilizes a flexible foil-type disc having audio and/or video information recorded on at least one surface thereof in a substantially similar manner as a phonographic record is known and is currently commercially available. The flexible foil-type, information-storage disc, which is hereinafter referred to as a video disc for the sake of description of the present invention, is formed on one surface with a consecutive groove spirally inwardly extending towards a central opening thereof, which groove provides information carrier tracks corresponding in number to turns or convolutions of the spiral groove. One or both of video and audio signals are recorded in this groove after having been frequency-modulated.

In order, for example, to reproduce video information, i.e., one or both of the video and audio signals, that has been recorded on the video disc, a known video disc player employs a disc driving system by which the disc is driven only at its center at a relatively high speed, for example, 1,800 rpm. and, while being rotated, hovers on a rotation-induced air cushion above a stationary plate or table. A scanner having a scanning stylus moves across the video disc in the radial direction with the scanning stylus mechanically engaged and guided in the spiral groove in the video disc.

Unlike the physical nature of the spiral groove in the phonograph record, the spiral groove in the video disc has a track-to-track spacing, that is, a pitch between the adjacent two turns of the spiral groove, of less than 10 $\mu$ and the thickness of the video disc is in the order of 100 $\mu$. Furthermore, the video disc is very light-weight and has a relatively high flexibility.

Because of the physical nature of the video disc, in order to keep a good reproducibility of the audio and-/or video information for a substantially long period of time, each video disc should be carefully treated or handled by the reason known to those skilled in the art. To this end. some models of conventional video disc player is provided with an automatic disc loading and unloading system which substantially excludes the necessity for an operator of the video disc player to touch the video disc, but only requires the operator to insert into and remove from the disc receiving chamber of the video disc player a protective envelope containing therein a video disc.

One type of conventional automatic disc loading and unloading system comprises at least one transfer roll rotatably supported in position adjacent the outer periphery of the stationary table and a curved back-up guide supported rearwardly of the transfer roll with respect to the table so that, during rotation of the transfer roll in one direction, the video disc within the protective envelope which has been positioned within the disc receiving chamber of the video disc player, is removed out of the protective envelope and subsequently transferred onto the stationary table while frictionally sandwiched between the peripheral surface of the transfer roll and the curved back-up guide and, during the rotation of the transfer roll in the opposite direction, the video disc on the stationary table is transferred back to the disc receiving chamber and then into the protective envelope in the reverse manner with respect to the transfer from the disc receiving chamber to the stationary table.

This type of automatic disc loading and unloading system is quitely different in structure and function from the following type to which the present invention pertains and, therefore, no detailed description thereof in relation to the present invention appear to be needed.

Another type of automatic disc loading and unloading system is disclosed in the Japanese patent application, which had been laid open to public inspection on Apr. 26, 1973 under No. 31908/1973 and which corresponds to a combination of German patent application Nos. 21 43 382.9 and 21 50 524.8 filed in Federal Republic of Germany on Aug. 26, 1971 and Oct. 6, 1971, respectively. German application No. 21 43 382.9 corresponding to U.S. Pat. No. 3,899,181.

According to the Japanese patent application referred to above, the disc loading and unloading system appears to be fragmentarily disclosed for the purpose of illustration of a method of loading into and unloading from the disc receiving chamber a video disc which is accommodated within the particular disc envelope with which the invention of the Japanese patent application referred to above is exclusively concerned.

However, so far as what is available from the Japanese patent application referred to above is concerned, the automatic disc loading and unloading system comprises a disc lifting member operatively supported adjacent the entrance through which the envelope with the disc therein is adapted to be inserted into the disc receiving chamber, which lifting member is pivotable between projected and retracted positions, and a clamping assembly arranged in 180° opposed relation to the lifting member with a major portion of the stationary table situated therebetween. The clamping assembly includes a roll element situated above the peripheral edge of the stationary table, a clamping member cooperative with the roll element and being pivotally supported for movement between engaged and disengaged positions and a detecting member which retains the clamping member in the disengaged position against a biasing force imposed on said clamping member to urge said clamping member to the engaged position.

When the video disc is to be loaded, the disc loading and unloading system of the above construction is operable in such a manner that, when the detecting member is pivoted rearwardly, i.e., in a direction opposed to the stationary table, by the application of an external pushing force transmitted thereto through the disc protective envelope being inserted into the disc receiving chamber, the clamping member is pivoted to the engaged position to clamp between the roll element and the clamping member a peripheral portion of the video disc which is exposed to the outside through a recess formed in the protective envelope. Subsequent manipulation of an operating knob, which is coupled to the clamping member through a cam arrangement and which is necessary to return the clamping member towards the disengaged position, which manipulation is carried out after the empty protective envelope has been removed out of the disc receiving chamber, allows the video disc to fall by gravity onto the stationary table.

On the other hand, when the video disc on the stationary table is to be unloaded, that is, inserted back into the protective envelope, the empty envelope is first inserted into the disc receiving chamber through the entrance. As the empty protective envelope enters the entrance leading to the disc receiving chamber, the lifting member is upwardly moved to elevate another peripheral portion of the video disc on the stationary table so as to cause said peripheral portion of said video disc to enter into the empty envelope being inserted.

In the conventional disc loading and unloading system disclosed in the Japanese patent application referred to above, there have been found some problems necessary to be solved in order to complete a video disc player employing such system. These problems left unsolved are associated, for example, with:

i. reliability of disengagement between the detecting member and the clamping member which must be achieved, in order for the clamping member to be pivoted towards the engaged position, in response to abutment of the front edge of the disc containing envelope being inserted;
  ii. reliability of opening the empty envelope which must be achieved, in order for the video disc on the stationary table to enter into the empty envelope as the latter is inserted into the disc receiving chamber, immediately after the empty envelope has been inserted through the entrance leading to the disc receiving chamber; and
  iii. reliability of passage of the disc containing envelope over a rotary mount during insertion of the envelope into the disc receiving chamber, which rotary mount is projecting outwardly through the stationary table and may otherwise provide an obstruction to such passage of the disc containing envelope.

In addition to, and probably because of, the problems left unsolved, there can be found some structural drawbacks. For example, since the lifting member and the clamping assembly are operated separately and independently and one or both of the lifting member and the clamping assembly are not operatively coupled to operating mechanisms of the video disc player, there is a great possibility that one or both of the video disc and the scanning stylus are ultimately damaged. Furthermore, complicated manipulating procedures are required in loading and unloading the video disc with respect to the video disc player.

Accordingly, the present invention has for its essential object to provide an improved video disc player of a type utilizing a flexible foil-type, information-storage disc, which video disc player is provided with an automatic disc loading and unloading apparatus easy to manipulate and reliable in operation, with substantial elimination of the disadvantages and inconveniences inherent in the conventional disc loading and unloading systems.

Another object of the present invention is to provide an improved video disc player of the type referred to above, wherein the automatic disc loading and unloading apparatus includes a disc catching assembly and a lifting member both operatively coupled to each other and in turn associated with operating mechanisms of the video disc player.

These and other objects and features of the present invention will become apparent from the following description taken in conjunction with preferred embodiments thereof with reference to the accompanying drawings, in which:

FIGS. 10 to 14 illustrate a sequence of disc loading and unloading operation to be performed in the video disc player according to the present invention;

Figure 1:
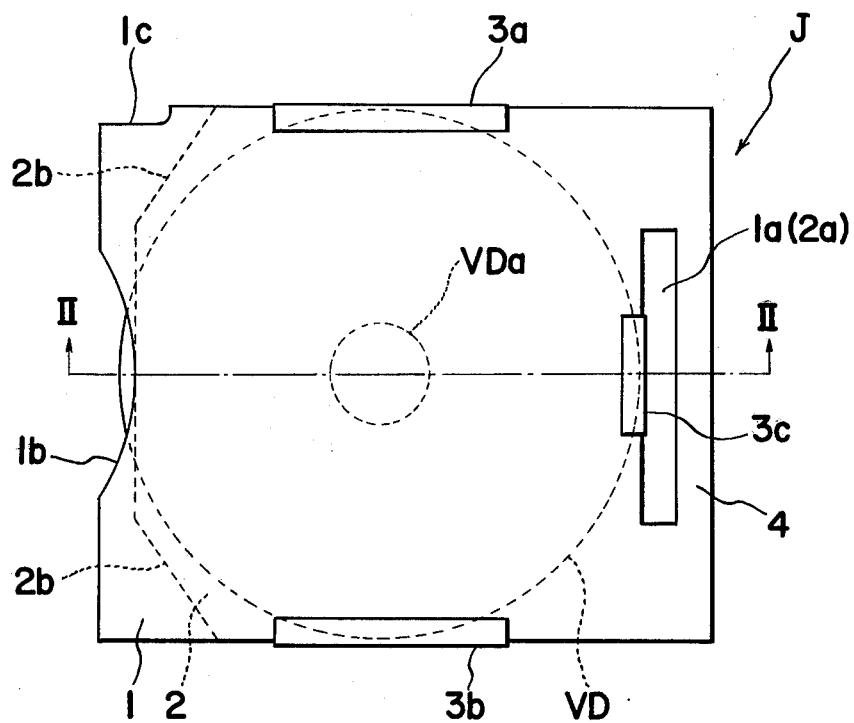
FIG. 1 is a schematic top plan view of a disc protective envelope which can be utilized in a video disc player according to the present invention.

Before the description of the present invention proceeds, it is to be noted that like parts are designated by like reference numerals throughout the accompanying drawings. In addition, because of complexity of the video disc player, various units of the video disc player are individually described under a particular heading for facilitating a ready understanding of the present invention.

PROTECTIVE ENVELOPE

Figure 2:
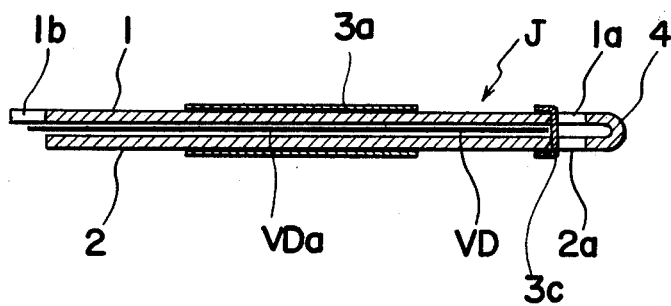
FIG. 2 is a cross sectional view taken along the line II in FIG. 1.

The protective envelope, generally indicated by J throughout the accompanying drawings, which is adapted to accommodate therein a video disc VD and which can be utilizable in the video disc player embodying the present invention, is best shown in FIGS. 1 and 2. The protective envelope J shown in FIGS. 1 and 2 is substantially identical with a commercially available disc envelope sold with a video disc therein and does not, therefore, constitute the subject matter of the present invention. However, for the purpose of description of the video disc player embodying the present invention, the construction of the disc envelope J is herein described.

Referring now to FIGS. 1 and 2, in which the disc envelope J is somewhat exaggeratedly shown, the disc envelope J comprises first and second plate members 1 and 2 each having a length greater than the outer diameter of the video disc VD and a width slightly greater than the outer diameter of the same video disc VD, the length of the first plate member 1 being greater than that of the second plate member 2 by the reason which will become clear later. Each of the first and second plate members 1 and 2 has an elongated opening 1a or 2a formed therein and extending widthwise adjacent one end thereof, said openings 1a and 2a cooperating with each other to provide a grip portion 4 of the disc envelope J. The plate members 1 and 2 are secured to each other, in order to form a envelope chamber therebetween, with the openings 1a and 2a exactly aligned with each other by means of lengthes of adhesive tapes 3a, 3b and 3c; the adhesive tapes 3a and 3b being used to connect respective side portions of one of the plate members 1 to adjacent side portions of the other of the plate members 2 while the adhesive tape 3c is used not only to connect one of cut edges, which are left in one of the plate members 1 to define the opening 1a, to the adjacent one of cut edges which are left in the other of the plate members 2 to define the opening 2a, but also to define the position in which the video disc VD is completely accommodated within the envelope chamber of the disc envelope J.

The adhesive tapes 3a to 3c may be of a commercially available type. However, as best shown in FIG. 2, each of the adhesive tapes 3a to 3c is preferably of a type wherein adhesive material is, during the manufacture thereof, applied on both side portions of a tape substratum so that, when used to secure the plate members 1 and 2 to each other in the manner described above, the adhesive tape 3a, 3b or 3c has both side portions contacting the plate members 1 and 2 while a non-adhesive portion of the tape 3a, 3b or 3c intermediate of the width thereof is aligned with the plane of contact between these plate members 1 and 2.

At the other end of the plate member 1 remote from the grip portion 4 of the disc envelope J, a substantially rounded recess 1b is formed intermediately of the width of the plate member 1, which rounded recess 1b extends to such a maximum depth that a play margin, about 5 mm. or more in the radial direction, of the video disc VD, which is located adjacent the outer periphery of the video disc VD, can be exposed to the outside of the envelope chamber of the disc envelope J. In addition, one of the four corners of the plate member 1, which is adjacent said other end of the plate member 1 and substantially next to the rounded recess 1b, is inwardly notched at 1c to provide an engagement notch cooperative with a stop member which is formed in a stationary table arrangement, as will subsequently be described, thereby to avoid the possibility that the disc envelope J with or without the video disc VD therein is erroneously inserted into a disc receiving chamber of the video disc player.

On the other hand, while the second plate member 2 has a length substantially equal to the distance between one end of the first plate member 1 adjacent the opening 1a and the bottom of the rounded recess 1b in the first plate member 1, the other end of the second plate member 2 has both side corners truncated to provide an inclined edge 2b, a substantially intermediate portion of said other end of said plate member 2 extending a distance sufficient not to allow portions of the outer periphery of the disc VD to be exposed outside from the inclined edges 2b.

It is to be noted that, although in the foregoing description the plate members 1 and 2 have been described as separate members, they may be prepared from a single web of sheet merely by completely bending at a substantially intermediate portion thereof such as shown in FIG. 2.

Material for the plate members 1 and 2 and, more specifically, the disc envelope J, may be any flexible sheet having a thickness preferably greater than the thickness of the video disc VD, but capable of exhibiting a relatively high deformable property. For example, two- or three-ply Bristol board or any other similar cardboard may be used.

It is also to be noted that, instead of the employment for the lengthes of adhesive tapes 3a to 3c of the adhesive tape of a type wherein adhesive material is applied on one of the opposed surfaces of a tape substratum, an adhesive tape of a type wherein adhesive material is applied on both surfaces of a tape substratum may be employed in which case the first and second plate members 1 and 2 must have a width sufficient to accommodate, in addition to the outer diameter of the video disc VD, twice the width of the adhesive tape. In any event, the adhesive tape, whatever the type may be, is not the only means for securing the first and second plate members 1 and 2 to each other, but any bonding agent may well be employed singly or in combination with the adhesive tape. Particularly, where the adhesive tape having both adhesive surfaces or the bonding agent is employed, the openings 1a and 2a may be omitted which in turn eliminates the necessity of the adhesive tape 3c.

While the disc envelope J is constructed as hereinabove fully described, the left-hand and right-hand ends of the disc envelope J as viewed in FIGS. 1 and 2 will be referred to as "front end" and "rear end" of the disc envelope J, respectively, in the following description and the appended claims, it being, therefore, understood that the disc envelope J has at the front end thereof an opening leading to the jacket chamber of the disc envelope J while the grip portion 4 if formed at the rear end thereof.

It is further to be noted that, the disc envelope J may include a flexible or rigid encasement into which the disc envelope J is, when not in use for the purpose of storage, inserted with the front end first.

In any event, what is essentially required in the disc envelope J for application in the video disc player embodying the present invention is that the play margine on the video disc VD adjacent the outer periphery thereof can be partially bared from the front end of the disc envelope J to the outside for the purpose, as will be described in more details later, of enabling the disc VD within the disc envelope completely inserted into the disc receiving chamber of the video disc player to be drawn out of said disc envelope as the latter is being removed from the disc receiving chamber of the player.

STATIONARY TABLE ARRANGEMENT

The stationary table arrangement is best shown in FIGS. 3 to 6, reference to which will now be made.

Figure 5:
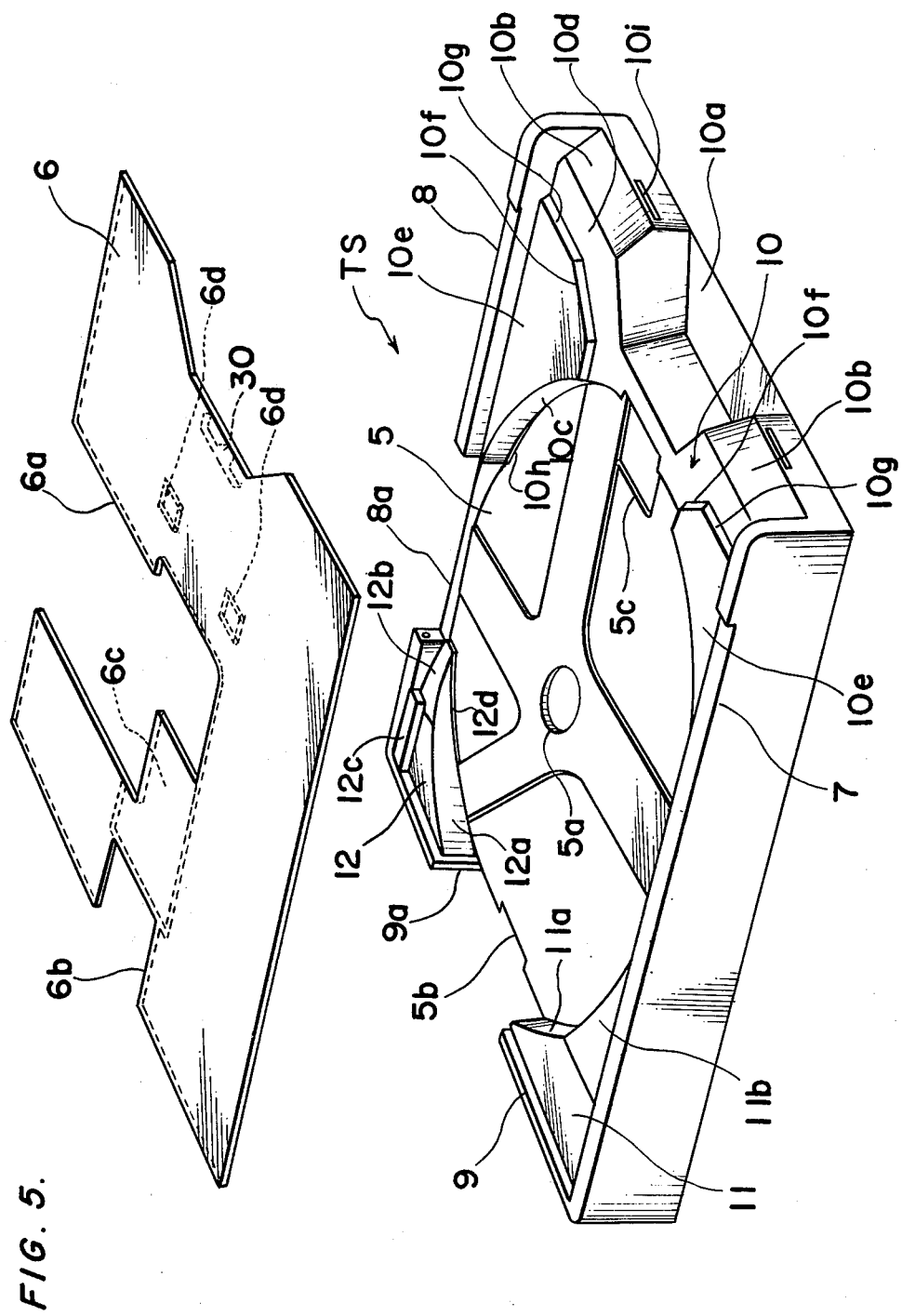
FIG. 5 is an exploded view of a stationary table arrangement in the video disc player of FIGS. 3 and 4.
Figure 7:
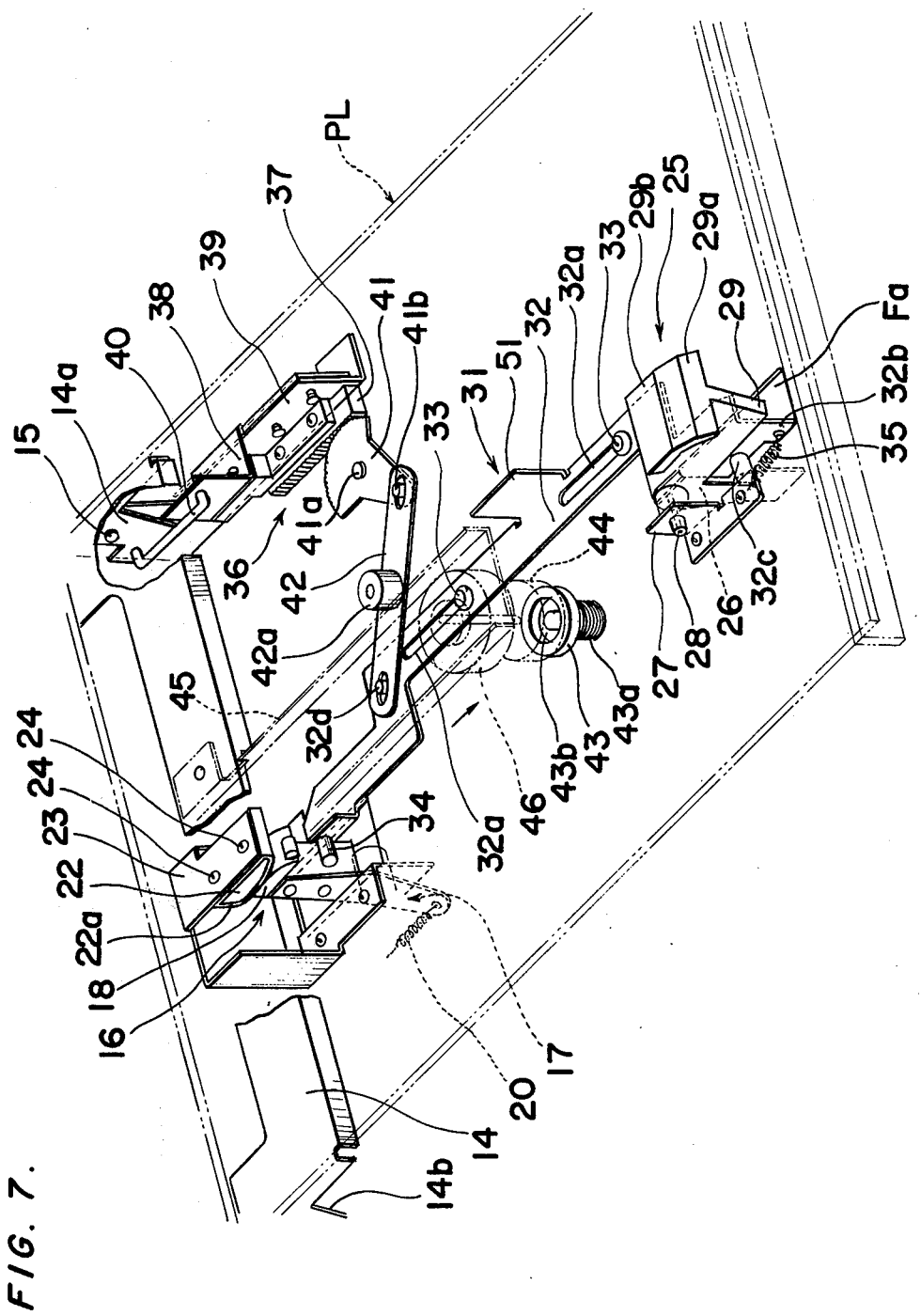
FIG. 7 is a perspective view of a portion of the video disc player of FIGS. 3 and 4, showing the details of linkage between a disc catching assembly and a lifting member and also that between any of the disc catching assembly and the lifting member and a disc holding mechanism.

The stationary table arrangement comprises a table structure TS, best shown in FIG. 5, which table structure TS includes a stationary platform 5 cooperative with a top panel 6 to define a disc receiving chamber between said platform 5 and said top panel 6; a protective lid PL pivotally carried by either of the table structure TS or a cabinet of the video disc player for selective movement between opened and closed positions; a disc loading and unloading mechanism, best shown in FIG. 7, including a linkage system for operating the disc loading and unloading mechanism in a particular manner in response to the selective movement of the protective lid PL between the opened and closed positions; and a disc holding mechanism DH including a rotatable disc mount, coupled to a drive mechanism, for example, an electric motor M, and a disc holder structure cooperative with said disc mount, said disc holding mechanism DH further including a linkage system for operating the disc holder structure in a particular manner in response to the selective movement of the protective lid PL between the opened and closed positions.

For the purpose of facilitating a better and ready understanding of the stationary table arrangement, the table structure TS, the protective lid PL, the disc loading and unloading mechanism and the disc holding mechanism DH will now be described individually in the order given above under the following sub-headings.

(I) Table Structure TS

Figure 3:
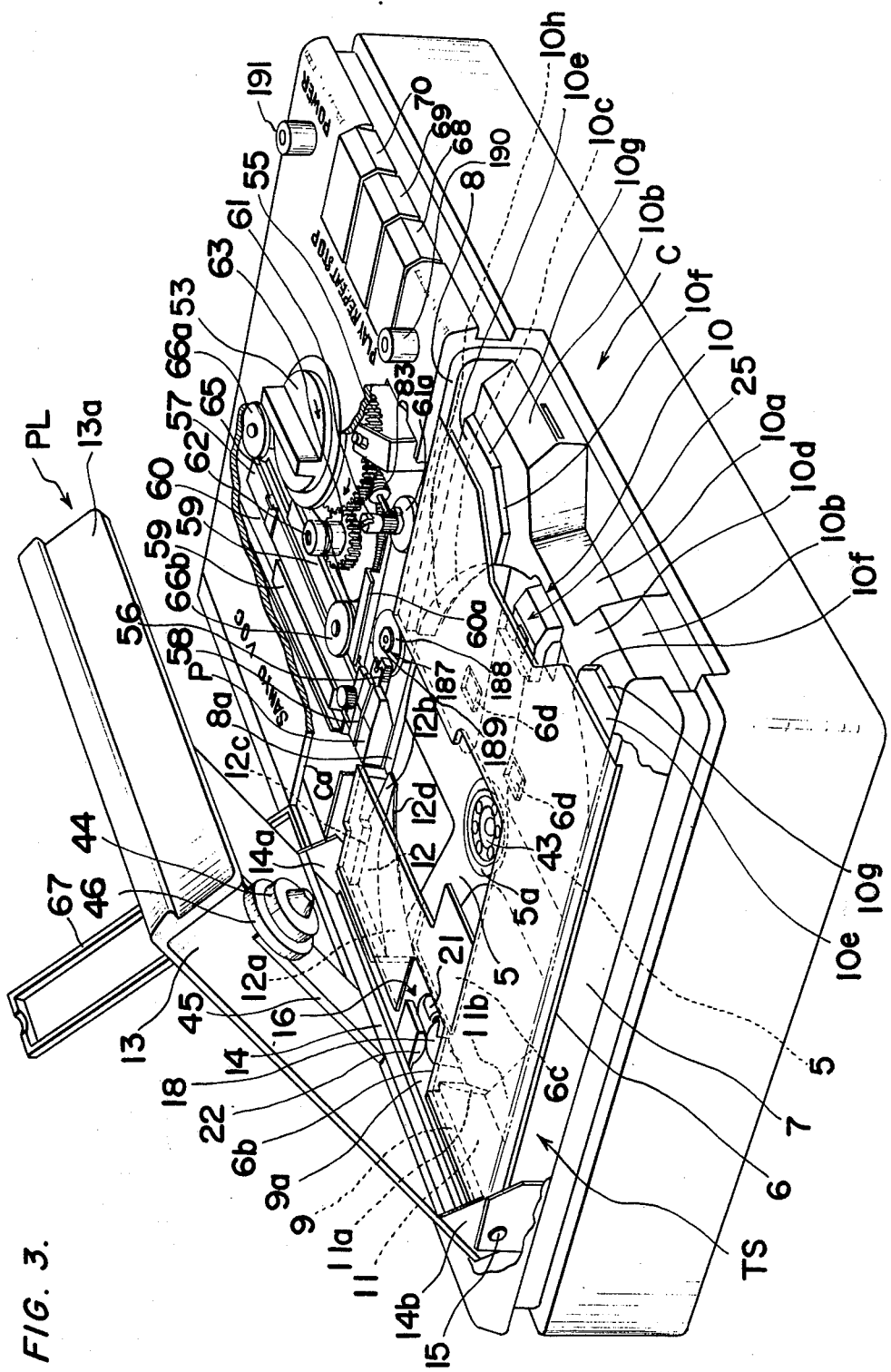
FIG. 3 is a perspective view, with a portion broken away, of the video disc player embodying the present invention.
Figure 4:
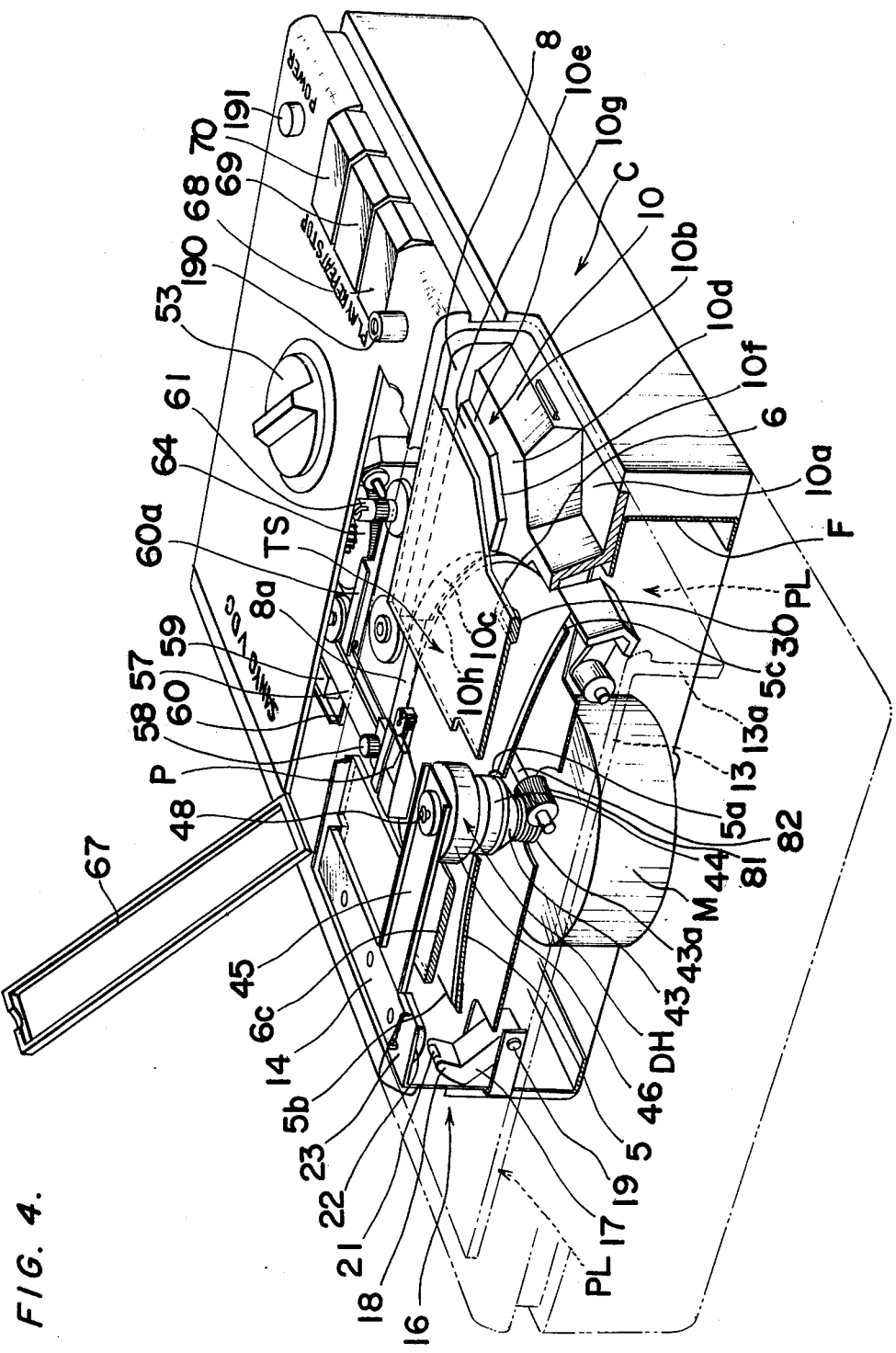
FIG. 4 is a view similar to FIG. 3, with a lid removed away to show the details of a disc loading and unloading device.

The table structure TS is, as best shown in FIGS. 3 and 4, stationarily mounted at a left-hand portion of the cabinet C of the video disc player on a chassis or framework F accommodated within said cabinet and, as hereinbefore described, includes the stationary platform 5 and the top panel 6. As best shown in FIG. 5, the stationary table structure TS further includes a pair of upright side walls 7 and 8, spaced from each other a distance substantially equal to the width of the disc envelope J, and a rear wall 9; said side wall 8 being formed with a cut-out portion 8a for the access of a pickup assembly P, which will be described later, and said rear wall 9 being also formed with a cut-out portion 9a for accommodating a component of the disc loading and unloading mechanism as will be described later. The table structure TS is formed at a portion opposed to the rear wall 9 with a porch 10 extending between the upright side walls 7 and 8 and having one side portion formed with an access recess 10a for the access of the hand of an operator of the video disc player during insertion and removal of the disc envelope J into and from the disc receiving chamber of the disc player. This porch 10 is also formed with a slope 10b on both sides of the access recess 10a.

The other side portion of the porch 10 is inwardly recessed to provide a rounded wall 10c of substantially semi-circular shape facing towards the rear wall 9.

The platform 5 for the support of the video disc VD during operation of the video disc player is defined by the rounded wall 10c of the porch 10 in cooperation with correspondingly rounded walls 11a and 12a respectively formed in substantially triangular benches 11 and 12. These benches 11 and 12 are respectively secured to, or otherwise integrally formed with, a joint between the rear wall 9 and the side wall 7 and a joint between the rear wall 9 and the side wall 8 and disposed at opposed corners adjacent said respective joints with the rounded walls 11a and 12a facing towards a central opening 5a formed in the platform 5.

The rounded walls 10c, 11a and 12a formed in the porch 10 and benches 11 and 12, respectively, are designed such as to occupy portions of the geometrical circle of a diameter greater than the outer diameter of the video disc VD.

For the purpose as will become clear from the subsequent description, a substantial apex portion 11b or 12b of each of the benches 11 and 12, which projects towards the porch 10, is downwardly inclined, thereby avoiding the possibility that the front end of the disc envelope J will otherwise be obstructed by the benches 11 and 12 before said disc envelope J is completely inserted into the disc receiving chamber of the video disc player.

The stop member which has already been described as cooperative with the engagement notch 1c in the disc envelope J is rigidly mounted on the bench 12 at 12c and held in position to engage into the engagement notch 1c in the disc envelope J only when the latter is correctly inserted into the disc receiving chamber of the video disc player. In other words, while the position in which the disc envelope J is completely inserted into the disc receiving chamber is defined by the rear wall 9 to which the front end of the disc envelope J abuts, the disc envelope J will be obstructed its passage by the stop member 12c with the front end of the disc envelope spaced from the rear wall 9, if the disc envelope J is incorrectly inserted into the disc receiving chamber in such a manner, for example, with the first plate member 1 held downwardly of the second plate member 2.

The porch 10 has a flat area 10d and a pair of spaced stages 10e, one adjacent the side wall 7 and the other adjacent the side wall 8, the plane of said spaced stages 10e lying above the plane of the flat area 10d. A step between the flat area 10d and each of the stages 10e is inclined to provide consecutive slopes 10f and 10g, the function of these slopes 10f and 10g being described later. It is to be noted that the slopes 10f and 10g at the respective steps between the flat area 10d and one of the stages 10e and between the flat area 10d and other of the stages 10e are positioned so as to assume a complementary relation to the shape of the front end of the second plate member 2 of the disc envelope J and, in particular, the slopes 10f extend in such a manner that, shortly after the disc envelope has entered the disc receiving chamber of the video disc player with the first plate member 1 held upwardly of the second plate member 2, the inclined edges 2b at the front end of the second plate member 2 simultaneously contact the respective slopes 10f and subsequently slide over said slopes 10f onto the stages 10e.

It is to be noted that the benches 11 and 12 are so sized and so positioned as to support thereon the front end of the second plate member 2 of the disc envelope J after the inclined edges 2b at the front end of the second plate member 2 have slid over the respective downwardly inclined apex portions 11a and 12a during the insertion of the disc envelope J into the disc receiving chamber.

For the purpose as will be described later in connection with the disc loading and unloading mechanism, the platform 5 is formed with a recess 5b, situated substantially intermediately of and contiguous to the cut-out portion 9a in the rear wall 9, and also with an opening 5c.

Referring to the stationary platform 5, the stationary platform 5 may have a flat upper surface. However, in the instance as shown, as can readily be understood from FIGS. 4, 6 and 10 to 14, the platform 5 is outwardly, i.e., upwardly, curved so as to have a line of crest which extends across the center of the central opening 5a between the side walls 7 and 8 in parallel relation to the direction of scan of the pick-up assembly P.

During operation of the video disc player which will be described later, the video disc VD rotates at its center above a rotation-induced air cushion created by the flow of air. As will be described later in more detail, the air for the air cushion flows from the central opening 5a in the platform 5 and is then deflected towards the rounded walls 10c, 11a and 12a, which substantially surround the platform 5, flowing below the rotating video disc under the influence of a centrifugal force induced by the rotation of the video disc. The air thus centrifugally expelled towards the rounded walls 10c, 11a and 12a must be exhausted without being deflected by said rounded walls 10c, 11a and 12a, or otherwise the video disc being rotated will undergo a wavy motion by the effect of turbulent flow of air.

For enabling the air centrifugally expelled towards the rounded walls 10c, 11a and 12a to be exhausted without being deflected thereby, substantially elongated exhaust openings are respectively formed in the rounded walls 10c, 11a and 12a adjacent the platform 5, only two of which exhaust openings are illustrated in FIGS. 3 to 5 by 10h and 12d as formed at the respective bottom portions of the rounded walls 10c and 12a.

Although in the foregoing description the table structure TS has seen described as composed of the separate components described above and, in fact, it can be assembled with these separate components, the table structure TS may be of one-piece construction and can be manufactured by, for example, a plastic molding technique.

Referring to the top panel 6 shown in FIGS. 3 to 6, the top panel 6 is mounted on the table structure TS with both side portions secured to the associate upright side walls 7 and 8 by means of sets of fastening members, for example, screws. In this condition, the top panel 6 substantially bridges over the platform 5, thereby defining the disc receiving chamber of the video disc player.

The top panel 6 is formed at 6a with an access hollow having one end opened to assume a contiguous relation to the cut-out portion 8a in the upright side wall 8 and the other end terminating substantially above the central opening 5a in the platform 5, a substantially intermediate portion of said access hollow 6a extending immediately above the path of movement of the pickup assembly P. It is to be noted that, if the pickup assembly P is, together with at least a portion of a carriage for the support of the pickup assembly P, constructed in such a compact size as to enable the pickup assembly to move below and clear of the level of the top panel 6, a portion of the access hollow 6a adjacent the cut-out portion 8a may be omitted.

The top panel 6 is also formed at 6b with an inwardly extending recess for accommodating a component of the disc loading and unloading mechanism as will be described later, said recess 6b being situated immediately above the recess 5b in the platform 5. It is to be noted that an end portion of said top panel 6 on both sides of said recess 6b is held in contact with the rear wall 9 when said top panel is mounted in position on the table structure in the manner described above while the other end portion thereof opposed to said recess 6b is situated substantially above the flat area 10d of the porch 10 to define in cooperation with said porch 10 the entrance through which the disc envelope J is inserted into the disc receiving chamber above the platform 5.

Secured to, or otherwise integrally formed with, the undersurface of the top panel 6 which faces towards the disc receiving chamber is guide pieces; one being designated by 6c and located between the recess 6b and the internal end of the access hollow 6a and the other two being designated generally by 6d. The guide pieces 6d are located on the opposite side of the guide piece 6c, with the internal end of the access hollow 6a situated between said guide pieces 6c and said guide pieces 6d, in spaced relation to each other in a direction perpendicular to the direction of movement of the disc envelope J being inserted or removed.

These guide pieces 6c and 6d serve to prevent the disc envelope J, particularly the first plate member 1 of the disc envelope J, from slidingly contacting the top panel 6 over the entire surface thereof, which may otherwise deteriorate the outer appearance of the disc envelope J. In addition to the above described functional feature common to these guide pieces 6c and 6d, they have their own additional functional features, which will now be described.

The guide piece 6c serves to ensure an exact engagement of the disc VD, which has been completely inserted into the disc receiving chamber together with the disc envelope J, with a "biting" mechanism of the disc loading and unloading mechanism in a manner as will be described in more detail. On the other hand, the guide pieces 6d serve to slightly depress the disc envelope being inserted into the disc receiving chamber so as to avoid the possibility that, during further insertion of the disc envelope J, the front end of the disc envelope abuts against one cut edge of the access hollow 6a which may constitute a bar to the passage of said disc envelope J.

As best shown in FIGS. 3 and 5, that end of the top panel 6 which is opposed to the recess 6b has a substantially intermediate portion preferably inwardly recessed to such an extent as to provide, in cooperation with the access recess 10b in the porch 10, a space sufficient to accommodate the hand of the operator holding the grip portion 4 of the disc envelope J which has been inserted into or is to be drawn from the disc receiving chamber of the video disc player.

Material for the top panel may be any synthetic plate or a glass. However, in order to allow the operator to view the disc receiving chamber, a semi-transparent or transparent plate, either plastic or glass, is preferred.

(II) Protective Lid PL

As best shown in FIG. 3, the protective lid PL, preferably made of a semi-transparent plastic material, comprises a top cover 13 having a front end provided, or otherwise integrally formed, with a flap 13a. While the top cover 13 is adapted to overhand the disc receiving chamber through the top panel 6 when said protective lid PL is held in a closed position as will be described later, the flap 13a is adapted to substantially completely shield the entrance leading to the disc receiving chamber.

The protective lid PL further comprises, as best shown in FIG. 7, an elongated lid support 14 having both ends bent to provide a lug 14a or 14b. The lug 14a at one end of the lid support 14 has a length greater than the lug 14b at the other end of the lid support 14 by the reason which will become clear later.

Rigidly connected to this lid support 14 is the top cover 13 of the protective lid PL having the other, i.e., rear end mounted thereon as shown in FIG. 3. The lid support 14 is pivotally supported by means of connecting pins, generally indicated by 15 to the framework of the video disc player, thereby allowing the protective lid PL to pivots about the pins 15 selectively between the closed and opened positions as indicated by the solid and broken lines, respectively, in FIG. 6.

(III) Disc Loading And Unloading Mechanism

Referring now to FIGS. 3, 4, 6 and 7 and as best shown in FIG. 7, the disc loading and unloading mechanism comprises a disc 'biting' unit, generally indicated by 16. The biting unit 16 includes a pivotable elongated member 17 having one end integrally formed with, or otherwise rigidly connected with, a biting head 18, a substantially intermediate portion of said pivotable member 17 being pivotally mounted on a mounting pin 19 which is in turn journalled to the framework F. This pivotable member 17 is supported in the manner described above for movement between biting and releasing positions and is normally biased about the mounting pin 19 to the biting position by a spring element, such as a tension spring 20, suspended between the other end of the pivotable member 17 and the framework F.

Th pivotable member 17 of the construction described above is so positioned that, so long as the pivotable member 17 is held in the biting position as shown in FIGS. 3 and 7, a portion of the member 17 adjacent the biting head 18 slightly penetrates into the recess 5b in the platform 5 with said head 18 located immediately above the outer peripheral portion of said platform 5.

The biting head 18 is so shaped as to extend in a direction substantially perpendicular to the longitudinal axis of the member 17 and towards the center of the platform and has one end integral with the pivotable member 17 and the other end rotatably carrying a roll element 21, the axis of rotation of said roll element 21 extending at right angles to the direction of movement of the disc envelope J being inserted into or drawn out of the disc receiving chamber. An upper surface 18a of the biting head 18 opposed to the lower surface thereof which is connected to the pivotable member 17 is outwardly curved by the reason as will become later.

Functionally cooperative with the biting head 18 is a counter-head 22 rigidly secured to a support chassis 23 by means of a plurality of set screws 24, which support chassis 23 extends from the framework F, said counter-head 22 being thus held in position immediately above the biting head 18 of the pivotable member 17 in its biting position. The counter-head 22 is of a substantially semi-circular shape in cross section and, therefore, has a curved face adapted to engage the biting head 18 through an elastic lining 22a applied to said curved face of said counter-head 22. Material for the elastic lining 22a is preferably a highly flexible rubber, either natural or synthetic, having a relatively high frictional coefficient. This elastic lining 22a may be applied either to the curved face of the counter-head 22 or to the entire circumferential surface of said counter-head 22.

In the arrangement so far described, the biting head 18 and the counter-head 22 are so positioned that, so long as the pivotable member 17 is held in its biting position, they provides a substantially V-shaped notch adapted to receive therein the play margine of the video disc VD only when the disc envelope J with the video disc VD therein is completely inserted into the disc receiving chamber, said flexibility and frictional coefficient of the material for the elastic lining 22a being so selected that, after the play margine of the video disc VD has been received or wedged into the V-shaped notch defined by said biting head 18 and said counter-head 22 and when the disc envelope J, which has been inserted into the disc receiving chamber, is to be drawn out of said disc receiving chamber, the disc VD remains frictionally held in contact with the elastic lining 22a and caught between the biting head 18 and the counter-head 22 while allowing the disc envelope J to be removed relative to said video disc VD.

It is to be noted that, depending upon the magnitude of a force employed to pivot the pivotable member 17 from the biting position towards the releasingposition against the tension spring 20, an elastic lining similar to the elastic lining 22a, which has been described as applied to the curved face of the counter-head 22, may be applied to the outwardly curved surface 18a of the biting head 18, irrespective of the employment of the elastic lining 22a and, that is, with the elastic lining 22a employed or not employed in the counter-head 22.

The position of the roll element 21, although it may not be always necessary, but the employment thereof is recommended by the reason which will become clear later, is so selected as to be substantially below the plane of contact between the biting head 18 and the counter-head 22 and also below the plane of movement of the disc envelope J within the disc receiving chamber.

The disc loading and unloading mechanism further comprises a disc lifting unit, generally indicated by 25, which lifting unit 25 is located in opposite to the disc biting unit 16.

Figure 6:
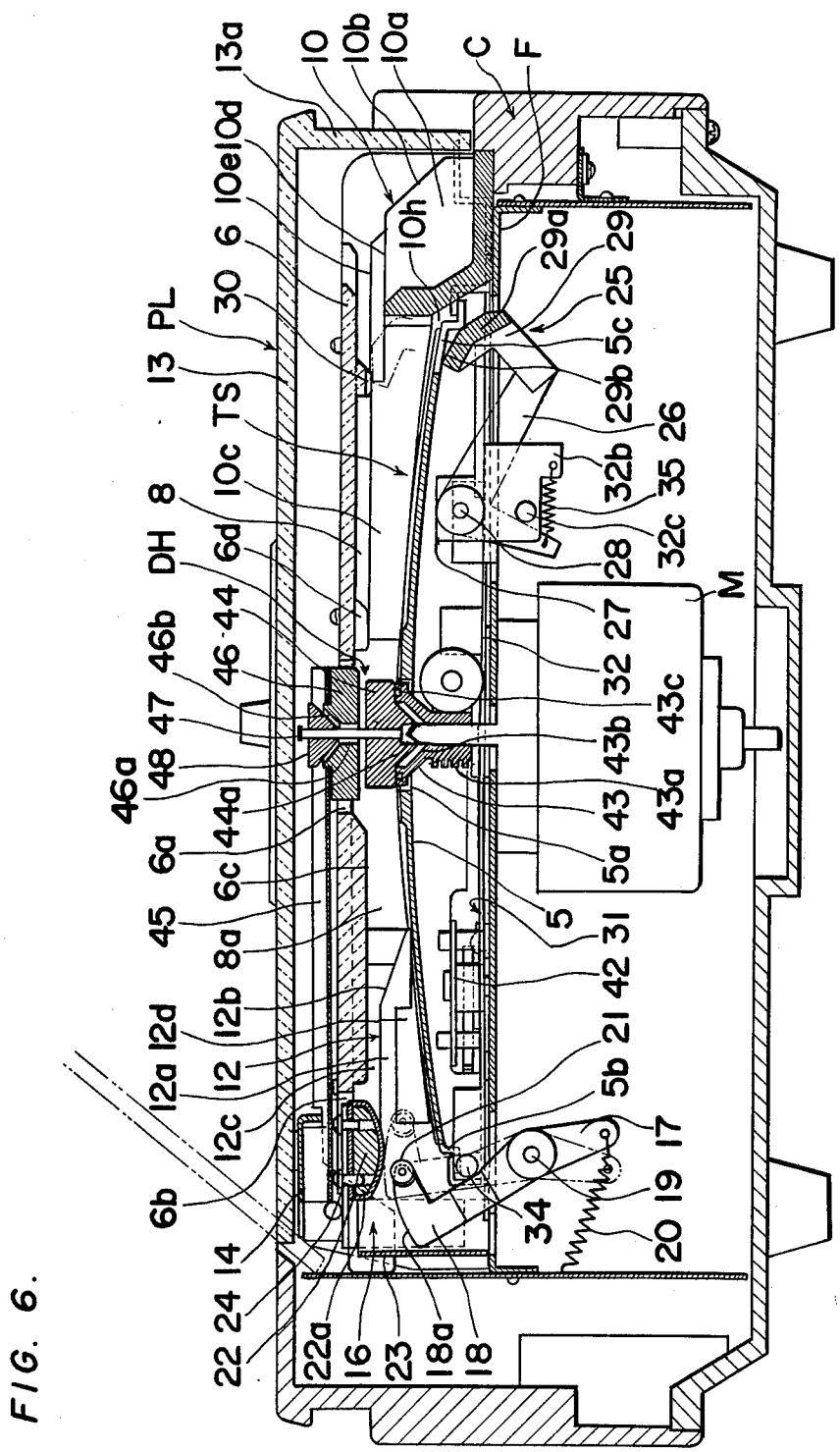
FIG. 6 is a side sectional view of the video disc player of FIGS. 3 and 4, with the lid held in its closed position.

Referring now to FIGS. 3, 4, 6 and 7 and as best shown in FIGS. 6 and 7, the disc lifting unit 25 includes a pivotable member 26 pivotally supported by the framework F by means of a support chassis 27 to which said pivotable member 26 is connected by means of a mounting pin 28 for pivotal movement about said mounting pin 28 between lifting and lowering positions. The pivotable member has a lifting member 29 of substantially inverted L-shape having one end connected to, or otherwise integrally formed with, one end of the pivotable member 26, and the other end formed into a lifting head 29a adapted to project through the opening 5c in the platform 5. The pivotable member 26 is supported in the manner described above for pivotal movement about the mounting pin 28 between lifting and lowering positions; said lifting head 29a, when said pivotable member 26 is in said lifting position, being projected through the opening 5c in the platform 5 to assume a position above the platform 5 for the purpose as will be described later and as shown in FIGS. 3 and 7. On the other hand, when said pivotable member 26 is moved to said lowering position in a manner as will be described later, said lifting head 29a is retracted below the platform 5 as shown in FIGS. 4 and 6.

It is to be noted that the lifting head 29a is so shaped as to have a contact face 29b which, when said lifting head 29a is outwardly projected through the opening 5c in the platform 5 with said pivotable member 26 moved to the lifting position, establishes a parallel relation to the undersurface of the top panel 6, as fragmentarily indicated by the broken line in FIG. 6, thereby allowing the outer peripheral portion of the video disc VD to be sandwiched between said contact face 29b of said lifting head 29a and a depresser 30, said depresser 30 downwardly projecting from the undersurface of the top panel 6 towards the opening 5c in the platform 5.

The biting unit 16 and the lifting unit 25 are operatively associated with each other in such a manner as will now be described, by means of a linkage system, generally indicated by 31 in FIG. 7, in response to the movement of the protective lid PL between the closed and opened positions.

The linkage system is best shown in FIG. 7 and comprises a slider 32 mounted below the platform 5 on the framework F by means of a plurality of pins 33 tapped into said framework F through corresponding slots 32a formed in said slider 32. The slider 32 has a first operating pin 34 rigidly mounted on one end of said slider 32, which operating pin 34 has its longitudinal axis extending substantially perpendicular to the pivotable member 17 of the biting unit 16 and is held in constant contact with a portion of said pivotable member 17 adjacent the biting head 18. This operating pin 34 serves not only to move the pivotable member 17 from the biting position towards the releasing position, but also to define the biting position of the pivotable member 17 as a stopper. It is to be noted that the stroke of movement of the operating pin 34 and, therefore, that of the slider 32, is defined by the length of each of the slots 32a in cooperation of the corresponding pin 33 which is so selected as to correspond to the span between the biting and releasing positions to the pivotable member 17.

The other end of the slider 32 opposed to the operating pin 34 is formed with a lug 32b which extends through an opening Fa, formed in the famework F, and is, therefore, situated below the plane of said opening Fa. The lug 32b carries a stop pin 32c rigidly secured thereto, which stop pin 32c is constantly engaged to a portion substantially intermediate between the free end of said pivotable member 26 and the mounting pin 28 by way of a spring element, such as a tension spring 35, suspended between the free end of the pivotable member 26 and said lug 32b. The position of said stop pin 32c on said lug 32b is so selected that, when the slider 32 slidingly movable between first and second positions in a manner as will be described later is held in one of the first and second positions, for example, the second position as shown in FIG. 6, the pivotable member 26 is held in the lowering position with said lifting head 29a located completely below the level of the opening 5c in the platform 5.

The tension spring 35, when the slider 32 is moved from the second position towards the first position as shown in FIG. 7, draws the free end of the pivotable member 26 with that portion adjacent the free end constantly engaged to the stop pin 32c, thereby causing the pivotable member 26 to pivot about the pin 28 from the lowering position towards the lifting position. When the pivotable member 26 attains the lifting position with the contact face 29b of the lifting head 29a held in contact with the depresser 30 on the top panel 6 and also with that portion of the pivotable member 26 adjacent the free end thereof possibly separated from the stop pin 32c, the tension spring 35 may exert a maximum pulling force of such a value as to be selected in consideration of the following features to be simultaneously achieved:

a. When the disc envelope with the video disc VD therein is to be inserted into the disc receiving chamber, the play margine of the video VD, which is exposed to the outside from the front end of the disc envelope J, will, as the front end of the disc envelope J enter the entrance leading to the disc receiving chamber, receive no resistance which will otherwise result in deformation or bent of the play margine of the video disc VD. In other words, when the front end of the disc envelope J being inserted is to pass through between the contact face 29b of the head 29a and the depresser 30, the lifting head 29a is allowed to lower, without substantially imparting any resistance to the passage of the front end of the disc envelope J, to let the disc envelope J to pass therethrough.

b. When the video disc VD, which has been resting on the platform 5, is to be upwardly lifted in readiness for removal thereof from the platform 5 into the disc envelope J to be subsequently inserted, the outer peripheral portion of the disc VD upwardly lifted in this way will not be firmly sandwiched between the contact face 29b and the depresser 30.

The slider 32 is moved in response to the movement of the protective lid PL in such a manner that, when the protective lid PL is moved to the opened position, said slider 32 assumes the first position and, when said protective lid PL is moved to the closed position, said slider 32 assumes the second position. Therefore, it is clear that the biting unit 16 and the lifting unit 25 are operatively so associated that, when the pivotable member 17 is pivoted about the pin 19 from the biting position towards the releasing position in response to the movement of the slider 32 from the first position towards the second position, the pivotable member 26 pivots about the pin 28 from the lifting position towards the lowering position and, on the other hand, when said member 17 is pivoted from the releasing position towards the biting position in response to the movement of the slider 32 from the second position towards the first position, the member 26 pivots from the lowering position towards the lifting position.

The linkage system further comprises a motion translator, generally indicated by 36, for translating the pivotal movement of the protective lid PL into the linear movement of the slider 32. The motion translator 36 includes a rack 37 rigidly carried by a movable carriage 38, which carriage 38 is movably supported on the framework F by means of a chassis 39. Although a method of mounting of the carriage 38 on the chassis 39 is not illustrated, it is to be understood that the carriage 38 is movably mounted on said chassis 39 in a method similar to the mounting of the slider 32 on the framework F which is achieved by way of slot-and-pin engagement.

The carriage 38 is in turn connected to the lug 14a of the lid support 14 by means of a connecting rod 40 so that the pivotal movement of the protective lid PL can be transmitted to said carriage 38 through said connecting rod 40 thereby causing said carriage 38 to move in a linear direction in response to said pivotal movement of said protective lid PL.

Constantly meshed or engaged to the rack 37 is a sector gear 41 rotatably mounted on the framework F by a mounting pin 41a, which sector gear 41 is in turn operatively coupled to the slider 32 by means of a connecting lever 42. The connecting lever 42 is pivotally mounted on the framework F by a mounting pin 42a, which rotatably supports a substantially intermediate portion of said connecting lever 42, and has one end loosely coupled to said sector gear 41 through a connecting pin 41b on said sector gear 41 and the outer end loosely coupled to said slider 32 through a connecting pin 32d on said slider 32.

From the foregoing description, it is clear that the slider 32 is moved from the first position towards the second position or from the second position towards the first position in response to the pivotal movement of said protective lid PL from the opened position towards the closed position or from the closed position towards the opened position, respectively. (IV) Disc Holding Mechanism DH Referring still to FIGS. 3, 4 and 6, the disc holding mechanism DH comprises a disc mount 43 rigidly mounted on a drive shaft of the motor M in coaxial relation thereto and for rotation together therewith. The disc mount 43 has one end externally toothed to form a gear 43a and the other end formed with a socket 43b inwardly tapered in coaxial relation to the axis of rotation of the drive shaft of the motor M. The disc mount 43 has an annular flange radially outwardly extending from said other end of said disc mount 43, which annular flange has an annular magnet, or otherwise circularly arranged pieces of magnet, embedded at 43c. Said other end, that is, annular end, of said disc mount 43 is so positioned substantially within the central opening 5a in the platform 5 that the annular face of said annular end of the disc mount 43 slightly projects outwardly into the disc receiving chamber from the line or crest of curvature of the platform 5, the distance of such projection substantially corresponding to the height of the video disc hovering above the rotation-induced air cushion.

The disc holding mechanism DH further comprises a disc holder 44 operable in cooperation with the disc mount 43 for holding the video disc VD in position between said disc mount 43 and said disc holder 44. The disc holder 44 has one end formed with a downwardly extending projection 44a of a shape complementary to the shape of the socket 43b in the disc mount 43, which projection 44a is adapted to engage into said socket 43b. This disc holder 44 is loosely carried by an elongated bar 45 having one end rigidly connected to, or otherwise integrally formed with, the lid support 14 and the other end rigidly mounted with a carrier 46 for the disc holder 44, a substantially intermediate portion of said elongated bar 45 extending in parallel and spaced relation to the top cover 13 of the protective lid PL.

The carrier 46 is, when the protective lid PL is in the closed position as shown in FIG. 6, situated immediately above the disc mount 43 and has a support hole 46a formed therein, which support hole 46a has one end radially outwardly enlarged at 46b facing towards a space between the elongated bar 45 and the top cover 13.

A spindle 47 has one end rigidly connected to, or otherwise integrally formed with, the disc holder 44 and the other end rigidly carrying a substantially inverted conical block 48 of a shape complementary to the shape of the enlarged end 46b of the support hole 46a in the carrier 46, a substantially intermediate portion of said spindle 47 loosely extending through said support hole 46a.

The disc holder 44 and the conical block 48 which are connected to each other by the spindle 47 as hereinabove described, are so spaced from each other that, when the protective lid PL is in the closed position, the conical block 48 and a portion of the spindle 47, which extends through the support hole 46a, are completely clear of the carrier 46 on one hand and the holder 44 and the disc mount 43 hold the video disc VD with the projection 44a extending into the socket 34b through a central opening VDa (FIG. 1) of the video disc VD on the other hand. Such being the case, even though the disc holder 44 rotates together with the disc mount 43 with the magnet 43c attracting the disc holder 44 through the video disc VD, no resistance is imparted to any of the disc mount 43 and disc holder 44.

On the other hand, when the lid PL is pivoted about the pins 15 from the closed position towards the opened position, the carrier 46 shifts upwards and, as said carrier 46 is further upwardly shifted together with further pivotal movement of the protective lid PL towards the opened position, the carrier 46 begins to upwardly shift the disc holder 44 with the conical block 48 seated within the enlarged end 46b of the support hole 46a in said carrier 46. Therefore, at the time the protective lid PL is completely opened, the disc holder 44 separates away from the disc mount 43 in such a manner as best shown in FIG. 3.

The stationary table arrangement having fully been described, it is to be noted that the carrier 46 may not be always necessary, in which case that end of the elongated bar 45 may have a perforation of a diameter smaller than the maximum outer diameter of the conical block 48. Moreover, instead of the employment of the elongated bar 45 which has been described as extending from the lid support 14 to a position above the disc mount 43, the carrier 46 may be suspended from the top cover 13 of the protective lid PL. It is further to be noted that the internal end of the access hollow 6a, which has been described as formed in the top panel 6 at a position above the central opening 5c in the platform 5, is so sized and so adapted as to accommodate the disc holder 44 together with the carrier 46.

Figure 13:
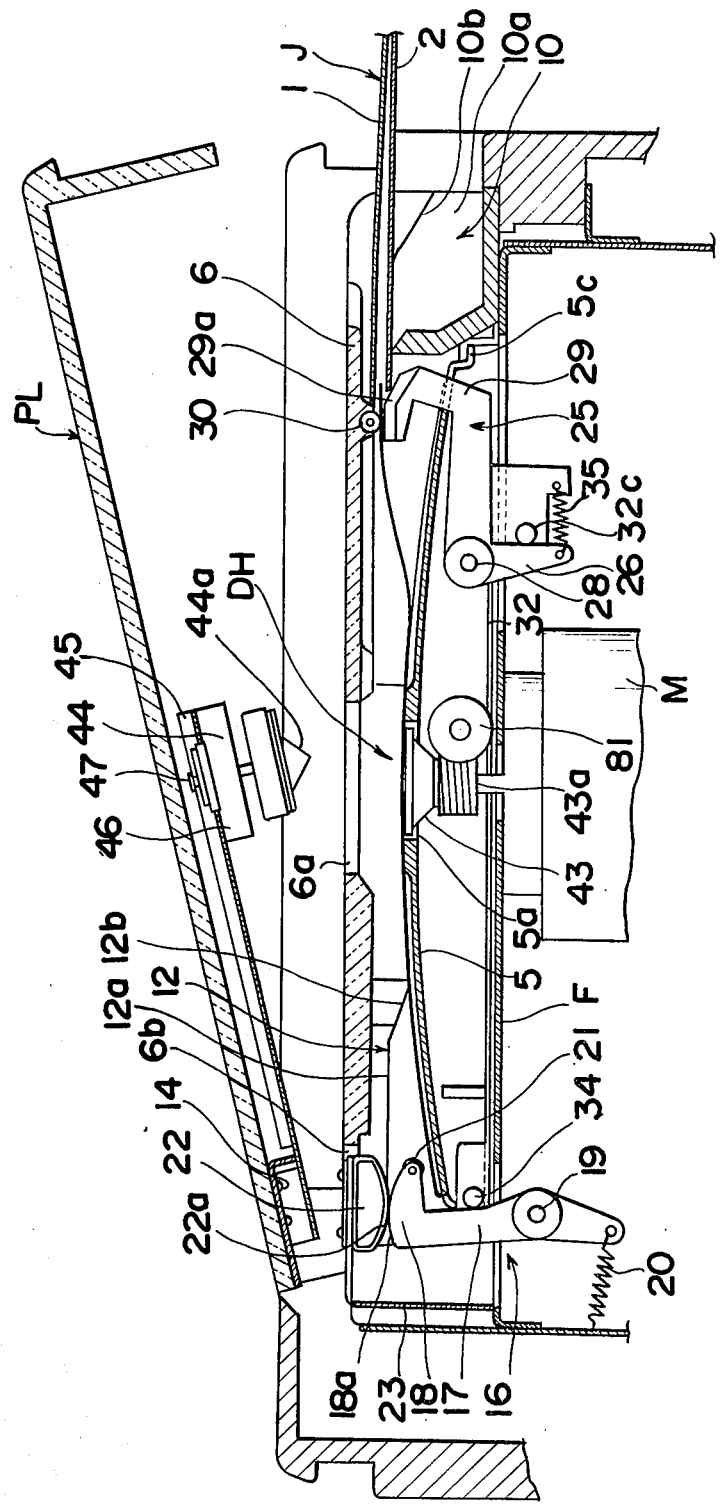

With respect to the depresser 30 provided in the top panel 6 and being cooperative with the lifting head 29a of the disc loading and unloading mechanism, it may be in the form of a projection which downwardly extend from the undersurface of the top panel 6, such as shown in FIGS. 4 and 6. Alternatively, the depresser 30 may be in the form of a roll element, such as shown in FIGS. 11 to 13, which is rotatably supported by the top panel 6 with the axis of rotation thereof extending perpendicular to the direction of movement of the disc envelope J into and from the disc receiving chamber. Preferably, the employment of the roll element for the depresser 30 is recommended in view of facilitation of a smooth movement of the disc envelope J without substantially impairing the video disc VD.

Although the annular magnet 43c has been described as embedded in the disc mount 43, it is to be noted that the same may be embedded in the disc holder 44.

PROTECTIVE LID LOCKING MECHANISM

The protective lid locking mechanism for locking the protective lid PL in the closed position only during operation of the video disc player, which will now be described with reference to FIGS. 8 and 9, may not be always necessary. However, by the reason which will become clear from the subsequent description, the employment of the locking mechanism is recommended, or otherwise there will be a great possibility that the video disc being reproduced is damaged and/or that the expensive pickup assembly is damaged. Such a possibility exists particularly when the protective lid PL is moved to the opened posidion during operation of the video disc player and, hence, during high speed rotation of the video disc above the platform 5 with or without the pickup assembly scanning the information carrier groove on the video disc VD.

Figure 8:
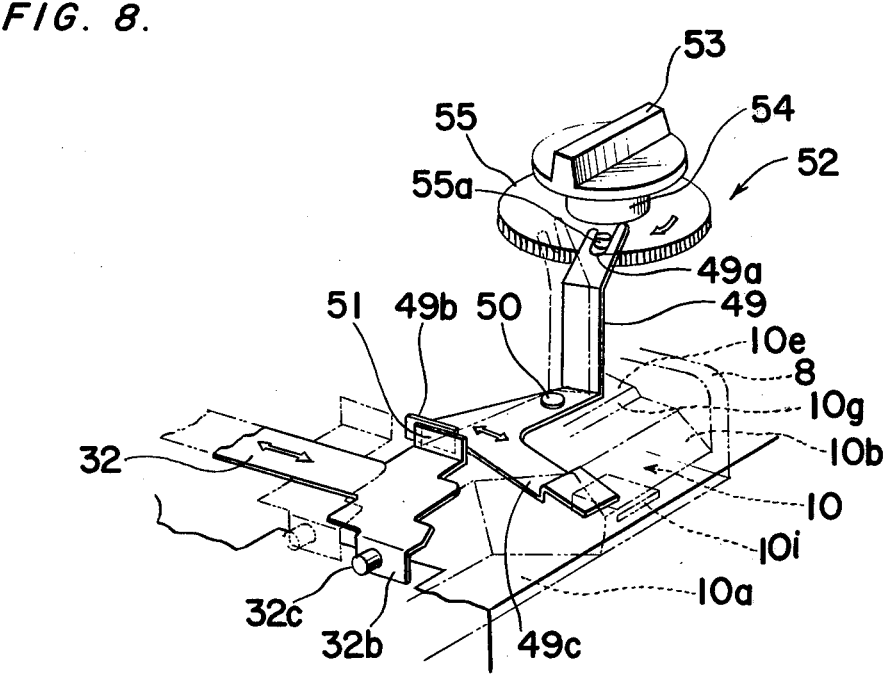
FIG. 8 is a perspective view of a portion of the video disc player of FIGS. 3 and 4, showing the details of a locking mechanism for the lid.
Figure 9:
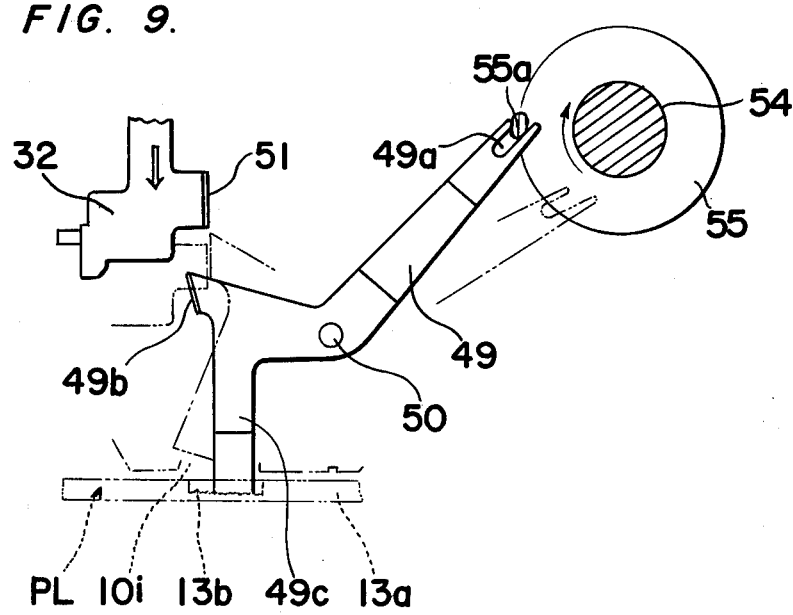
FIG. 9 is a top plan view of the locking mechanism shown in FIG. 8.

Referring now to FIGS. 8 and 9, the lid locking mechanism comprises a locking lever 49 having one end formed with an engagement groove 49a and the other end formed with an upright abutment 49b, a substantially intermediate portion of said locking lever 49 being pivotally mounted on the framework F by means of a mounting pin 50. The locking lever 49 has a finger 49c connected to, or otherwise integrally formed with, said locking lever 49 at a portion adjacent the upright abutment 49b and substantially transversely extending therefrom towards the flap 13a of the protective lid PL then in the closed position. This locking lever 49 is pivotable about the pin 50 between locked and unlocked positions respectively indicated by the solid and phantom lines in FIG. 9 and, when said locking lever 49 is in said locked position, the tip of said finger 49c outwardly projects through a slot 10i (FIGS. 3 to 5), formed in the porch 10, and is engaged into a locking groove 13b formed in the flap 13a of the protective lid PL thereby locking the latter in the closed position while, when said locking lever is in said unlocked position, the tip of said finger 49c is disengaged from the locking groove 13b and is, therefore, retracted inside the porch 10.

While a method of moving the locking lever 49 between the locked and unlocked positions will be described later, the construction so far described of the lid locking mechanism involves a possibility that the locking lever 49 is erroneously brought into the locked position even though the protective lid PL has not yet been brought to the closed position. In order to avoid this possibility, the upright abutment 49b cooperates with a stopper 51, which is integrally formed with, or otherwise rigidly mounted on, the slider 32 as shown in FIG. 7. The position of the upright abutment 49b in the locking lever 49 relative to the stopper 51 in the slider 32 is so selected that, when the slider 32 is held in the first position as indicated by the solid line in FIG. 8 and by the phantom line in FIG. 9 in which condition the protective lid PL is in the opened position, the abutment 49b is engaged to the stopper 51 with the locking lever 49 restricted in the unlocked position and, on the other hand, when the slider 32 is in the second position as indicated by the phantom line in FIG. 8 and by the solid line in FIG. 9 in which condition the protective lid PL is in the closed position, the abutment 49b is disengaged from the stopper 51 so that the locking lever 49 can be pivotable from the unlocked position towards the locked position without the angular movement of said abutment 49b being disturbed by the presence of the stopper 51.

For moving the locking lever 49 between the locked and unlocked positions in the manner as hereinabove described, there is provided a control knob assembly, generally indicated by 52, including a control knob 53 accessible to the hand of the operator of the video disc player and being, for this purpose, arranged outside the cabinet C as best shown in FIGS. 3 and 4. This control knob 53 is rotatably supported by the framework F through a shaft (only a portion of said shaft being shown by 54 in FIGS. 8, 15 and 16) having one end rigidly connected to said control knob 53 and the other end journalled to the framework F, it being understood that a substantially intermediate portion of said shaft 54 is also rotatably supported by a suitable bearing member.

The control knob assembly 52 further includes a gear wheel 55 rigidly mounted on said shaft 54 for rotation together with said control knob 53 and having a release pin 55a rigidly mounted on one of the opposed faces of said gear wheel 55.

That end portion of the locking lever 49 where the engagement groove 49a is formed is situated adjacent the gear wheel 55 in overlapping relation to said wheel 55 with said engagement groove 49a receiving therein said release pin 55a on said gear wheel 55. In the condition as shown in FIG. 8, the locking lever 49 is held in the unlocked position. Starting from this condition as shown in FIG. 8, the control knob 53 cannot be rotated in a direction indicated by the arrow so long as the protective lid PL is in the opened position because of the engagement between the abutment 49b and the stopper 51 on the slider 32 then held in the first position.

If the control knob 53 is rotated through a first predetermined angle in the direction as indicated by the arrow, starting from the condition as shown in FIG. 8, after the protective lid PL has been closed, the locking lever 49 can be pivoted about the pin 50 from the unlocked position to the locked position as shown in FIG. 9. Further rotation of the control knob 53 in the same direction through a second predetermined angle, which further rotation of said control knob 53 is automatically carried out in a manner as will be described later, allows the release pin 55a to disengage from the engagement groove 49a on that end of the locking lever 49. It is to be noted that, in the embodiment so far illustrated, the pickup assembly P is, simultaneously with the rotation of the control knob 53 through said first predetermined angle, brought from a rest position to an operative position immediately above the video disc VD as will be described in more details. In view of this, the possibility that the pickup assembly P is brought to the operative position during a period in which the protective lid PL is opened and no video disc has yet been loaded can also be avoided. In other words, the control knob 53 can be rotated in the direction of the arrow when and only when the protective lid PL is brought to the closed position.

ACCESS MECHANISM FOR PICKUP ASSEMBLY

Figure 15:
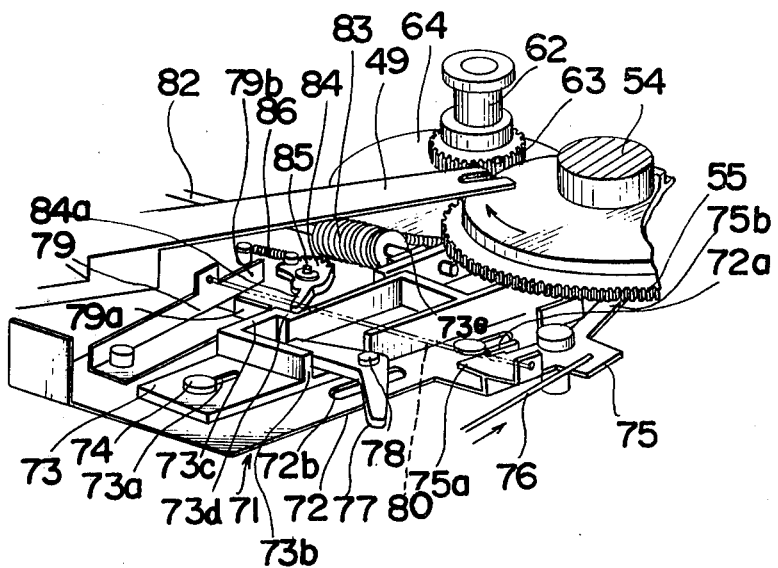
FIG. 15 is a perspective view of a portion of the video disc player of FIGS. 3 and 4, illustrating the details of operating mechanisms of the video disc player in one operational position.
Figure 16:
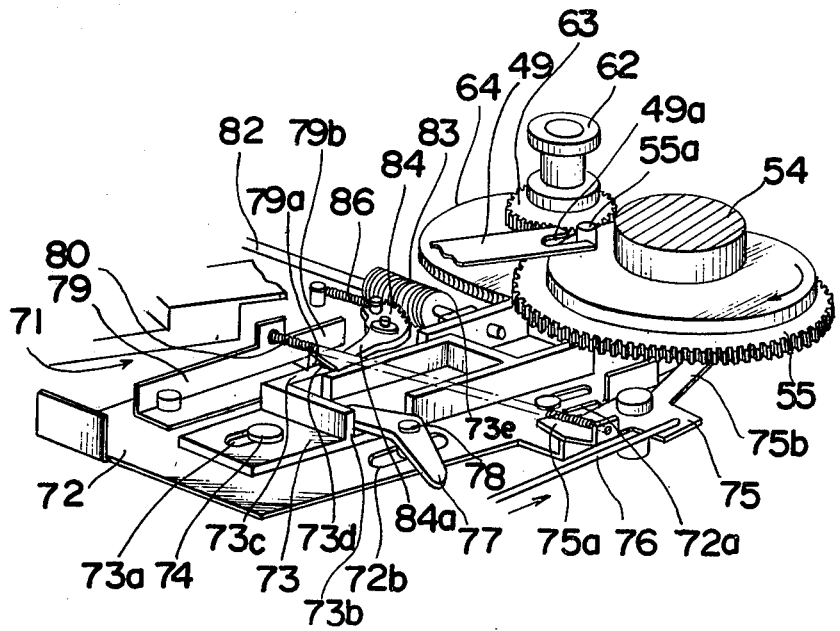
FIG. 16 is a view similar to FIG. 15, showing the operating mechanisms in another operational position.

Referring to FIGS. 3, 15 and 16, the pickup assembly P includes an arm 56 projecting outwardly therefrom and a pickup stylus (not shown) carried by said arm 56 at a free end thereof. This pickup assembly P is replaceably mounted on a slidable carriage 57 by means of a pickup holder 58 rigidly secured to one end of said slidable carriage 57. The slidable carriage 57 is sandwiched between a pair of opposed guide bars 59 and is supported thereby for sliding movement between the rest and operative position in a direction parallel to the line of crest of curvature of the platform 5. The support for the pickup assembly P, which is composed of such elements as designated by 57, 58 and 59, is so positioned as to allow the pickup stylus to be moved immediately above the line of crest of curvature of the platform 5 during the movement of the pickup assembly P between said rest and operative positions.

The guide bars 59 for the support of the slidable carriage 57 are rigidly mounted in spaced relation to each other on a tiltable base 60 forming a part of a contact pressure regulating unit. The tiltable base 60 is supported in position by the framework F of the video disc player for pivotal movement in a direction about the longitudinal axis of the slidable carriage 57 between engaged and disengaged positions and has one end adjacent the pickup assembly P rigidly connected, or otherwise integrally formed, with a feeler bar 60a.

The contact pressure regulating unit further includes an adjustment screw 61 having one end shaped to receive a screw driver and the other end adjustably tapped into the framework F, a substantially intermediate portion of said screw 61 having a flange 61a rigidly mounted thereon. The flange 61a on the adjustment screw 61 is adapted to support thereon the free end of the feeler bar 60a when said tiltable base 60 is pivoted from the disengaged position to the engaged position in a manner as will be described later. The position of the flange 61a can be adjustable merely by turning the adjustment screw 61 in either one of the opposite directions so that the pressure exerted upon contact between the pickup stylus and the video disc VD, which contact therebetween is achieved when the slidable carriage 57 is moved to the operative position and the tiltable base 60 is pivoted to the engaged position, can ultimately be adjusted to an optimum value.

The slidable carriage 57 is operatively coupled to the control knob 53 in such a manner as will now be described. Disposed adjacent the gear 55 coaxial with the control knob 53 is a transmission gear assembly composed of a common shaft having one end rotatably supported by the framework F and the other end rigidly mounted with a drive pulley 62, a smaller gear 63 and a larger gear 64 both rigidly mounted on a substantially intermediate portion of said common shaft for rotation together with said common shaft and also with each other; said smaller gear 63 being constantly meshed to the gear 55 coaxial with the control knob 53. A cable 65 having one end secured to the slidable carriage 57 at a portion adjacent the free end thereof which is remote from the pickup holder 58 extends around a first idle pulley 66a, rotatably mounted on the framework F which is located adjacent said transmission gear assembly, being then turned around said drive pulley 62 and finally turned around a second idle pulley 66b, which is also rotatably mounted on the framework F in spaced relation to said first idle pulley 66a, with the other end of said cable 65 secured to said slidable carriage at the same portion to which said one end of said cable 65 is secured.

From the foregoing, it is clear that, as the control knob 53 is rotated from its start position through the first predetermined angle, the rotation of said control knob 53 can be transmitted to the slidable carriage 57, first from the gear 55 to the smaller gear 63 and then from said smaller gear 63 to said slidable carriage 57 through the drive pulley 62 by way of the cable 65. Therefore, assuming that the video disc VD has been loaded within the disc receiving chamber and onto the platform 5 and the protective lid PL has subsequently been closed, the protective lid PL can be locked in the closed position during the rotation of the control knob 53 through the first predetermined angle in the direction of the arrow and, at the same time, the pickup assembly P can be moved from the rest position to the operative position with the pickup stylus situated immediately above the outermost turn of the information carrier groove on the video disc VD on the platform 5. Engagement of the pickup stylus with the groove on the video disc VD can be achieved when the tiltable base 60 is moved from the disengaged position towards the engaged position as will be described in the subsequent description.

It is to be noted that the access mechanism for the pickup assembly P of the construction described above is housed within the cabinet C at the right-hand portion thereof as best shown in FIG. 3. However, for facilitating the adjustment of the contact pressure between the pickup stylus and the video disc by turning the adjustment screw 61 and also for facilitating replacement of the pickup assembly P with a new one, an access opening is formed at Ca in the cabinet C, which access opening Ca is adapted to be selectively opened and closed by a hingedly supported lid 67. The hingedly supported lid 67 is, in the illustrated embodiment, shown as a separate member with respect to the protective lid PL and, however, may be an integral part of said protective lid PL.

During, for example, reproduction of audio and/or video information recorded in the video disc VD, the pickup assembly P moves towards the disc holding mechanism with the pickup stylus approaching the innermost turn of the groove on the video disc VD and, correspondingly the control knob 53, after having been manually rotated through the first predetermined angle, automatically rotate in the direction as indicated by the arrow through a second predetermined angle. It is to be noted that the first and second predetermined angles through which the control knob 53 can be rotatable have no clear distinction because, in the video disc player embodying the present invention, the control knob 53 can manually be rotated beyond the first predetermined angle in the direction of the arrow to place the pickup stylus, when the tiltable base 60 is pivoted to the engaged position, in position to reproduce the audio and/or video information from any desired location on the information carrier groove on the video disc VD. In this way, even though the control knob 53 can be manually rotatable beyond the first predetermined angle in the direction of the arrow, the protective lid PL is locked in the closed position at the time said control knob 53 has been rotated through said first predetermined angle. In practice, for the convenience of the operator of the video disc player, the control knob 53 has an index (not shown) printed or embossed thereon on one hand and a portion of the cabinet C adjacent the periphery of said control knob 53 has a plurality of equally spaced calibrations, the first one of said calibrations being spaced from the next one of said calibration with respect to the direction of the arrow a distance which corresponds to the first predetermined angle of rotation of the control knob 53. The remaining calibrations referred to above are used to visually represent the position of the pickup assembly relative to the turns of the spiral groove on the video disc V being then reproduced through the pickup stylus sequentially scanning said turns of said groove. In other words, the control knob 53 has a "OFF" position, a "START" position spaced a distance corresponding to the first predetermined angle of rotation and an "END" position spaced from said "START" position a distance corresponding to the second predetermined angle of rotation, it being understood that the protective lid PL is held in the closed position when the control knob 53 is rotated from the "OFF" position towards the "START" position and that the control knob 53 can be rotated in the direction of the arrow from the "START" position towards the "END" position as the pickup assembly P moves from the operative position towards the center of the video disc being reproduced. It is also to be understood that the control knob 53 can when the information recorded on the video disc VD is not desired to be reproduced from the beginning, be rotated past the "START" position to any desired position substantially intermediate between the "START" position and the "END" position.

OPERATING MECHANISM

As shown in FIGS. 3 and 4, the operating mechanism includes "PLAY", "REPEAT" and "STOP" keys 68, 69 and 70 all pivotally supported by the framework F in any known manner and so exposed to the outside through the cabinet C that the operator of the video disc player can be accessible to any of these keys 68, 69 and 70.

As best shown in FIGS. 15 and 16, the operating mechanism employs an actuating plate assembly generally indicated by 71 and including an actuating plate 72 supported in position for movement between inoperative and operative positions and a transmission plate 73 mounted on said actuating plate 72 for sliding movement between disengaged and engaged positions. The actuating plate 72 is operatively linked to the "PLAY" key 68 in such a manner that, when said key 68 is depressed, the actuating plate 72, which is normally biased to the inoperative position by a suitable spring element (not shown), is moved to the operative position against said spring element and is locked in said operative position with the "PLAY" key 68 consequently locked in a depressed position. On the other hand, the transmission plate 73 is slidably mounted on the actuating plate 72 by means of a plurality of mounting pins, only one of which is illustrated by 74, which extends through corresponding slots 73a formed in the transmission plate 73. This transmission plate 73 on the actuating plate 72 is normally biased to the engaged position, as shown in FIG. 15, by means of a suitable spring element (not shown). The length of each of the slots 73a in the transmission plate 73 is so selected as to make the stroke of movement of the actuating plate 72 between the inoperative and operative positions to be substantially equal to that of the transmission plate 73 between the engaged and disengaged positions, whereby the transmission plate 73 biased to the engaged position can move together with the actuating plate 72 when the latter is locked in the operative position. The transmission plate 73 can be moved to the disengaged position in response to depression of the "REPEAT" key 69 in a manner as will now be described when the actuating plate 72 is locked in the operative position and, therefore, when the "PLAY" key 68 is locked in the depressed position.

For locking the actuating plate 72 in the operative position and, therefore, locking the "PLAY" key 68 in the depressed position, the actuating plate 72 is formed at 72a with an engagement projection. Cooperative with this engagement projection 72a is a locking lever 75 pivotally supported by the framework F and has a hook formed as at 75a, which hook 75a is engageable with the engagement projection 72a after the actuating plate 72 has been moved to the operative position in response to the depression of the "PLAY" key 68 as shown in FIG. 15. The locking lever 75 is in turn coupled to the "STOP" key 70 by means of a connecting rod 76 having one end pivotally connected to said locking lever 75 and the other end coupled to the "STOP" key 70 by means of any suitable linkage system (not shown) so that, assuming that the actuating plate 72 is locked in the operative position in the manner as shown in FIG. 15, the hook 75a disengages from the engagement projection 72a, when the "STOP" key 70 is depressed and, therefore, the connecting rod 76 is moved in a direction indicated by the arrow, thereby causing the actuating plate 72 to be returned to the inoperative position by the effect of the spring element (not shown) with the "PLAY" key 68 returned from the depressed position to the original position.

The "REPEAT" key 69 is operatively coupled to an operating lever 77 pivotally supported by the framework F by means of a spindle 78 which loosely extends through a slot 72b formed in the actuating plate 72, said slot 72b having a length sufficient not to disturb the movement of the actuating plate 72. The operating lever 77 has one end operatively coupled to said "REPEAT" key 69 and the other end terminating substantially above the transmission plate 73 and adapted to engage an upright engagement formed at 73b in the transmission plate 73. When the operating lever 77 is pivoted about the spindle 78 in a counterclockwise direction as viewed in FIGS. 15 and 16 in response to depression of the "REPEAT" key 69 while the actuating plate 72 is locked in the operative position, that end of said operating lever 77 situated above the transmission lever 73 engages the upright engagement 73b and, thereafter, moves the transmission plate 73 from the engaged position towards the disengaged position against the spring element employed to bias said plate 73 to the engaged position.

The transmission plate 73 thus moved to the disengaged position can be locked in said disengaged position in such a manner as will now be described.

The actuating plate 72 carries a locking arm 79 having one end pivotally connected to the plate 72 and the other end formed with a pawl 79a and a barrier 79b and is pivotable between locked and unlocked position. This locking arm 79 is normally biased towards the locked position and in a direction close to the transmission plate 73 by a spring element, such as a tension spring 80 suspended between said locking arm 79 and the locking lever 75. On the other hand, the transmission plate 73 is formed thereon an upright wall 73c, one side portion of which upright wall 73c may, such as shown, be contiguous to the upright engagement 73b while the opposite side portion of said upright wall 73c is stepped at 73d to provide an engagement step engageable with said pawl 79a in said locking arm 79.

In the construction so far described, it is clear that, while the "PLAY" key 68 is locked in the depressed position and, therefore, the actuating plate 72 is locked in the operative position by the engagement of the hook 75a of the locking lever 75 to the engagement projection 72a, subsequent depression of the "REPEAT" key 69 results in the movement of the transmission plate 73 from the engaged position towards the disengaged position, which transmission plate 73 thus moved to the disengaged position is locked in said disengaged position by the engagement of the pawl 79a in the locking arm with the engagement step 73d in the transmission plate as shown in FIG. 16. Upon engagement of the pawl 79a with the engagement step 73d, the key 69 becomes held in a depressed position. During the movement of the transmission plate 73 from the engaged position towards the disengaged position, the pawl is held in sliding contact with the upright wall 73c in the transmission plate 73 until it is trapped into the engagement step 73d which defines the locked position of said locking arm 79.

The locking arm 79 thus brought to the locked position can be returned to the unlocked position against the tension spring as shown in FIG. 15 after a predetermined time has passed, in a manner as will be described later under the subsequent heading of drive mechanism.

The "PLAY" key 68 is operatively associated with the tiltable base 60, referred to under the heading of "Access Mechanism For Pickup Assembly", by means of a suitable linkage system (not shown) in such a manner that, when the key 68 is depressed, said tiltable base 60 is pivoted to the engaged position. As hereinbefore described, the pivotal movement of the tiltable base 60 results in the engagement of the feeler bar 60a on the disc 61a rigidly mounted on the adjustment screw 61 on one hand and, on the other hand, the pickup stylus being lowered ready to engage in the groove on the video disc VD.

The pivotal movement of the tiltable base 60 from the engaged position back to the disengaged position takes place after the pickup stylus enters the innermost turn of the information carrier groove on the video disc and when the index on the control knob 53, after having been rotated in the direction of the arrow in accordance with the movement of the slidable carriage 57, is brought into alignment with the "END" position of said control knob 53. To this end, the locking lever 75, which has been described as used to lock the actuating plate 72 in the engaged position and operatively coupled to the "STOP" key 70, is also formed with a feeler 75b slidingly engaged to the undersurface of the gear wheel 55. The feeler 75b is engageable with an actuating pin (not shown) secured to said undersurface of said gear wheel 55 and positioned so that, when the control knob 53 being rotated is brought to the "END" position, said actuating pin abuts said feeler 75b thereby pivoting the locking lever 75 in the counterclockwise direction as viewed in FIGS. 15 and 16.

The counterclockwise rotation of the locking lever 75 results in the disengagement of the hook 75a in said locking lever 75 from the engagement projection 72a in said actuating plate 72 and, therefore, the actuating plate 72 is returned back to the disengaged position accompanying the pivotal movement of the tiltable base 60 from the engaged position back to the disengaged position. From this, it is also clear that, even if no engagement between the actuating pin carried by the gear wheel 55 and the feeler 75b of the locking lever 75 takes place, the tiltable base 60 can be returned to the disengaged position upon depression of the "STOP" key 70 since the actuating plate 72 locked in the engaged position can be released in the manner as hereinbefore fully described.

DRIVE MECHANISM

The drive mechanism may employ an electric motor separate of the motor M used to rotate the video disc VD mounted on the disc mount 43 and sandwiched between said disc mount 43 and the disc holder 44. However, in the illustrated embodiment, the motor M is also used to drive the slidable carriage 57 for the pickup assembly P in such a manner as will now be described with reference to FIGS. 3, 4, 15 and 16.

Constantly meshed to the gear 43a formed in and coaxial with the disc mount 43 is a worm gear 81 rigidly mounted on one end of a transmission shaft 82, the other end of said transmission shaft 82 journalled to a bearing piece 73e which may be rigidly connected to or integrally formed with the transmission plate 73. The transmission shaft 82 has another worm gear 83 rigidly mounted thereon at a portion adjacent said other end of said shaft 82. The transmission shaft 82 is to be understood as supported in such a manner that, while the worm gear 81 is constantly meshed to the gear 43a, the worm gear 83 can be movable in a direction towards and away from the larger gear 64 coaxial with the smaller gear 63.

The worm gear 83 is engageable to the larger gear 64 only when the actuating plate 72 is moved to the operative position in response to depression of the "PLAY" key 68 and, at the same time, the transmission plate 73 is held in the engaged position. Therefore, it is clear that, when the "PLAY" key 68 is depressed with the actuating plate 72 locked in the operative position, the rotational force of the motor is transmitted to said larger gear 64 whereby the slidable carriage 57 for the pickup assembly can be moved in such a direction that the pickup stylus scans from the outermost turn towards the innermost turn of the information carrier groove on the video disc VD.

If the "REPEAT" key 69 is depressed while the pickup stylus is scanning the information carrier groove on the video disc VD, the transmission plate 73 is moved from the engaged position towards the disengaged position as shown in FIG. 16 and, therefore, the worm gear 83 is disengaged from the larger gear 64. During this condition, the pickup stylus is positioned to scan the same turns on the information carrier groove on the video disc VD repeatedly to reproduce a repeated picture.

In the video disc player embodying the present invention, the still reproduction lasts for a predetermined time, for example, 10 to 30 seconds by the the reason which will now be described with particular reference to FIGS. 15 and 16.

Disposed between the worm gear 83 and the barrier 79b in the locking arm 79 is a sector gear 84 having a release finger 84a integrally formed therewith. This sector gear 84 is rotatably supported by a mounting pin 85 and is biased counterclockwise about the pin 85 by a tension spring 86. The sector gear 84 engages the worm gear 83 only when the transmission plate 73 is moved to the disengaged position irrespective to the position of the actuating plate 72. However, when the transmission plate 73 is moved to the disengaged position in response to depression of the "REPEAT" key 69 while the actuating plate 72 is locked in the operative position, and, therefore, when the pawl 79a in the locking arm 79 is engaged to the engagement step 73d to lock the transmission plate 73, the rotational force of the worm gear 83 then disengaged from the larger gear 64 is transmitted to the sector gear 84, thereby causing the latter to pivot clockwise against the tension spring 86.

As the sector gear 84 is thus pivoted clockwise against the tension spring 86, the release finger 84a integral with said sector gear 84 approaches the barrier 79b and, after a predetermined period of time during which said sector gear 84 is engaged to said worm gear 83, the finger 84a abuts the barrier 79b thereby causing the locking arm 79 to pivot towards the unlocked position against the spring 80. As the locking arm 79 begins to move counterclockwise as hereinbefore described, the pawl 79a disengages from the engagement step 73d, thereby allowing the transmission plate 73 to return to the engaged position. Simultaneously with the return of the transmission plate 73 to the engaged position, the worm gear 83 is again engaged to the larger gear 64 whereby the remaining turns of the information carrier groove on the video disc VD can be scanned by the pickup stylus.

From the foregoing it is clear that, depending upon the number of teeth of the sector gear 84 engageable with the worm gear 83, the time during which the repeated reproduction is available can be determined. Where the repeated reproduction is desired to be continued for a desired period of time, it is within the obvious preview of expedition by those skilled in the art that, instead of the employment of the sector gear 84, a push button or a key similar to any of the keys 68 to 70 may be used and be coupled to said locking arm 79 so that depression of the push botton or key can apply an external pushing force necessary to move the locking arm 79 from the locked position towards the unlocked position against the tension spring 80.

In the construction so far described, it is obvious that, without manually rotating the control knob 53 from the "OFF" position to the "START" position, the closed protective lid PL can be locked in the closed position when the "PLAY" key 68 is depressed because the rotation of the worm gear 83 can also be transmitted to the gear 55 coaxial with the control knob 53 by means of the larger gear 64 and then the smaller gear 63. However, in practice, the "PLAY" key 68 is made to be depressable only after the control knob 53 has been manipulated to rotate from the "OFF" position to at least the "START" position. In order to achieve this, various methods can be employed. One of these method is to form a toothless portion of the larger gear 64 of such a size that the engagement between the worm gear 83 and the larger gear 64 takes place for the first time only when and after the key 68 has been depressed and the control knob 53 has been rotated from the "OFF" position to the "START" position.

Another method is to use a barrier which may be secured to the undersurface of the gear 55 in position to hamper the movement of the actuating plate 72 from the inoperative position towards the operative position so long as the control knob 53 coaxial with said gear 55 has not yet rotated from the "OFF" position towards the "START" position.

With the drive mechanism having fully been described, it is to be noted that the rotation of the disc mount 43 is synchronized with the movement of the slidable carriage 57 and, therefore, that of the pickup assembly P in such a manner that the pickup stylus sequentially scan the turns of the groove on the video disc VD from the outermost turn towards the innermost turn.

STYLUS GRINDING DEVICE

With reference to FIGS. 3 and 4, the stylus grinding device is indicated generally by 187 and is used to grind the tip of the stylus when the latter has been worn to an extent that satisfactory reproduction of the information on the video disc can no longer be continued.

This stylus grinding device 187 comprises a grinding disc 188 mounted on a shaft 189 for rotation together with said shaft 189, which shaft 189 is coupled to a drive shaft of an electric motor (not shown), or otherwise it may form a part of the drive shaft of the motor. The motor (not shown) is carried by a carriage (not shown) for movement between elevated and lowered positions and is normally biased to the lowered position by a biasing element (not shown). The grinding disc 188 has one surface formed into a grinding surface facing towards the pickup stylus when the pickup assembly P is held in the rest position. The motor together with its carriage is adapted to be upwardly moved to the elevated position by the operation of a solenoid unit (not shown) which is energized to shift the motor to the elevated position after a predetermined number of reproduction has been performed or after a predetermined period of cumulative time which the pickup stylus is actually used has been elapsed.

The pickup stylus is ground when the motor is upwardly shifted to the elevated position with the grinding surface of the grinding disc 188 engaged to the tip of the pickup stylus.

Return of the motor back to the lowered position takes place after a predetermined period of time has passed with the solenoid deenergized. To this end, an electric relay circuit adapted to be triggered on after the predetermined time may be used.

The stylus grinding device outlined above is not the subject matter of the present invention and, therefore, the details thereof are not described and illustrated.

The video disc player of the above construction may have a channel selector 190 composed, for example, of an electric switch inserted in an electric circuitry of the video disc player which is not the subject matter of the present invention. The switch is of a type having two positions; when said switch is in one position, audio information recorded in one of two channels can be reproduced while, when said switch is in the other position audio information recorded in the other of said channels can be reproduced.

In addition thereto, the video disc player may, even though the motor M is adapted to be energized in response to the depression of the "PLAY" key 68 such as in the foregoing embodiment, have a main power switch 191 (FIGS. 3 and 4) for selectively permitting and interrupting the supply of an electric power both to the electric circuitry of the player and to the motor irrespective of whether or not the motor M is adapted to be energized by the depression of the key 68.

OPERATION OF THE EMBODIMENT OF FIGS. 3 TO 16

The operation of the video disc player according to the embodiment of FIGS. 3 to 16 utilizing the disc envelope J of the construction shown in FIGS. 1 and 2 will now be described in the order of sequence of the handling procedures.

Assuming that the control knob 53 is positioned in the "OFF" position and no video disc is loaded within the video disc receiving chamber of the video disc player, the first procedure to be done is to open the protective lid PL. However, if the control knob 53 is positioned in a click stop position substantially intermediate between the "OFF" and "START" positions while no video disc is loaded within the video disc receiving chamber, it is necessary to turn the control knob 53 towards the "OFF" position in a direction opposite to the direction of the arrow, because the protective lid PL is locked in the closed position so long as the control knob 53 is positioned departing from the "OFF" position.

Figure 10:
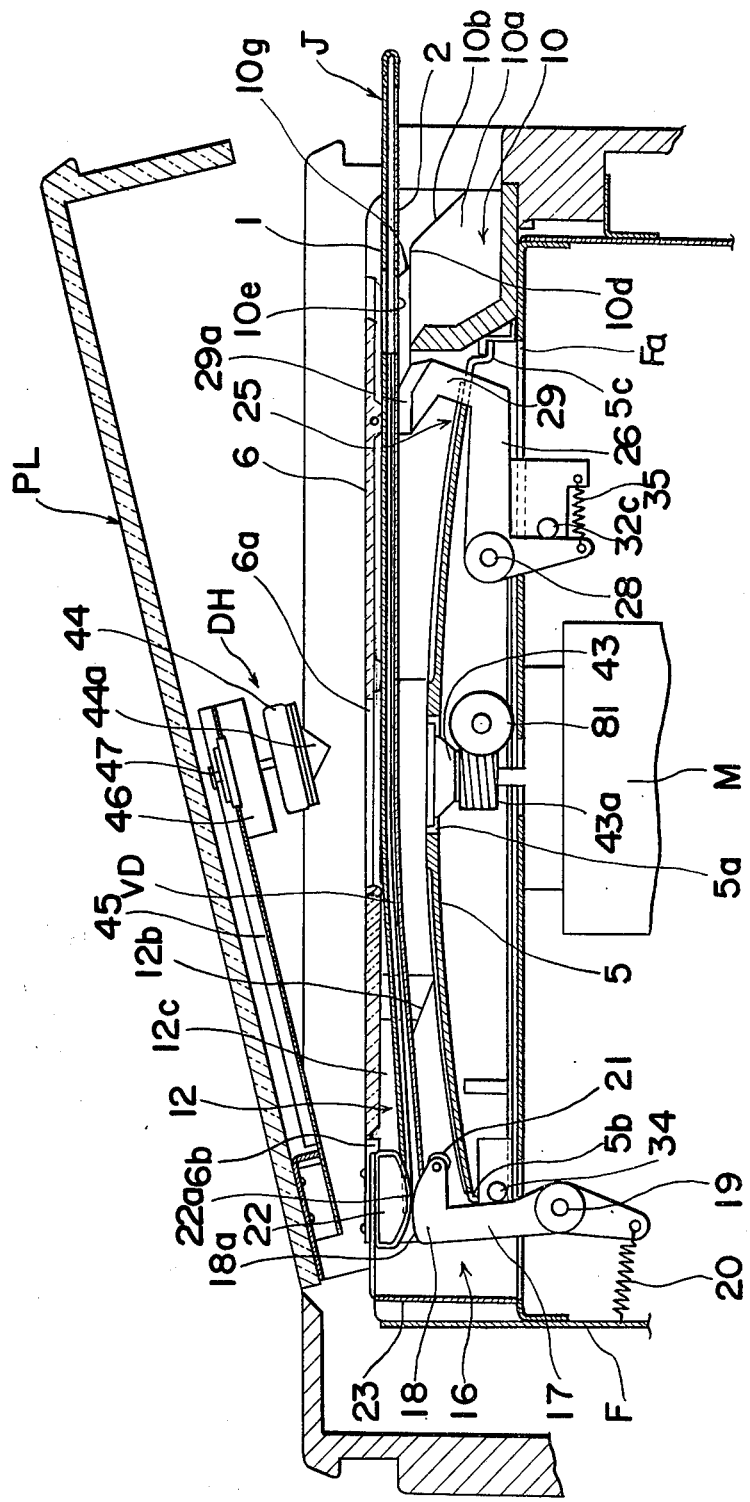

Starting from this, as the protective lid PL is opened, i.e., moved towards the opened position, the disc holder 44 is separated from the disc mount 43 on one hand and the pivotable member 17 of the disc biting unit 16 and the pivotable member 26 of the lifting unit 25 are respectively brought to the biting and lifting positions as shown in FIG. 10.

Subsequently, the disc envelope J with the video disc VD therein is inserted into the disc receiving chamber through the entrance with the front end thereof first. Immediately after the disc envelope J has been inserted through the entrance defined between the top panel 6 and the porch 10 of the table structure TS, the front end of the envelope J downwardly lowers the lifting head 29a against the tension spring 32c while sliding over the contact face 29b of the lifting head 29a.

Further insertion of the envelope causes the front end of the envelope J to approach the disc biting unit 16. As the front end of the envelope J, through which the outer peripheral portion of the video disc VD is exposed to the outside of the envelope J as hereinbefore described in connection with the construction of said video envelope J, approaches the disc biting unit 16, the opposed corner portions of the first plate member 1 of the envelope J which are adjacent the front end thereof ride the inclined apex portions 11b and 12b onto the benches 11 and 12, respectively, while the front end portion of the second plate member 2 of the disc envelope J is allowed to dangle by its own weight substantially as shown in FIG. 10. Still further insertion of the envelope J by the application of an external pushing force applied thereto through the grip portion 4 of the envelope J causes the outer peripheral edge of the video disc VD, which is exposed to the outside through the envelope, is substantially wedged into between the biting head 18 and the counter-head 22, as shown in FIG. 10 while the counter-head 22 is received in the rounded recess 1b at the front end of the first plate member 1 of the envelope J.

Thereafter, the envelope J is drawn out of the disc receiving chamber while the grip portion 4 of the envelope J is grasped by the hand of the operator of the video disc player. When the envelope J is drawn out of the disc receiving chamber in this manner, the video disc VD remains within the disc receiving chamber drawn out of the envelope J substantially as shown in FIG. 11. The reason for this possibility will now be described in detail.

As hereinbefore described, the counter-head 22 is lined with the elastic lining 22a made of rubber material having a high flexibility and a high frictional coefficient. In terms of a physical property of the material for the elastic lining 22a, the material therefor is of a type capable of being inwardly compressed upon application of the slightest possible impact such as applied when the peripheral edge of the video disc within the envelope J being inserted abuts against the elastic lining 22a. It is to be noted that, while the video disc VD itself is so highly flexible that, when said video disc is supported at the central opening VDa, it can deform under the influence of the gravity force to represent a substantially bevel shape, the outer peripheral portion of the same video disc VD which is exposed to the outside of the envelope J, that is, which is not supported between the first and second plate members 1 and 2 of the envelope J, is not so flexible. This can readily be understood from the fact that any flexible sheet material is rigid when considered in terms of the physical strength measured per unit area.

In view of the above, when the outer peripheral edge of the video disc within the envelope J enters the substantially V-shaped notch defined between the biting head 18 and the counter-head 22, said outer peripheral edge of the video disc acts to expand the gap in said V-shaped notch and the elastic lining 22a is consequently inwardly compressed to accommodate the outer peripheral portion of the video disc. Immediately after or no sooner than this has taken place, the disc envelope J is completely inserted into the disc receiving chamber with the front end thereof engaged to the rear wall 9 of the table structure TS. Thereafter, the disc envelope J is pulled in a direction opposite to the direction of insertion for removal the same out of the disc receiving chamber.

As the disc envelope J is pulled in this way, the video disc VD is gradually drawn out of the disc envelope with the outer peripheral edge held between the biting head 18 and the counter-head 22. This is possible because the biting force necessary to hold the outer peripheral edge of the video disc is sufficient to overcome the cumulative resistance imposed on the video disc VD in both directions from the first and second plate members 1 and 2 during relative sliding movement between said video disc VD and said disc envelope J.

It is to be noted that, because of the presence of a combination of the engagement notch 1c in the disc envelope J on one hand and the stop member 12c in the table structure TS on the other hand, the disc envelope J with the video disc VD therein will not be completely inserted into the disc receiving chamber if it is erroneously inserted thereinto upside down.

As shown in FIG. 11, at the time and after the empty disc envelope J has been removed out of the disc receiving chamber, the video disc VD is accommodated within the disc receiving chamber in such a manner as shown. Specifically, a portion of the outer periphery of the video disc VD, which is opposed to and 180° spaced from that portion of the same outer periphery held between the biting head 18 and the counter-head 22, is sandwiched between the lifting head 29a and the depresser 30 while an annular portion of the video disc adjacent the central opening VDa rests on the platform 5 and the disc mount 43. It is to be noted that, at this time, the central opening VDa of the video disc VD is not always exactly aligned with the opening of the socket 43b in the disc mount 43.

At any time after the empty disc envelope J has been removed out of the disc receiving chamber, the protective lid PL is to be closed, i.e., to be moved to the closed position.

During the pivotal movement of the protective lid PL from the opened position towards the closed position, the disc holder 44 is lowered towards the disc mount 43 on one hand and the slider 32 is moved towards the second position on the other hand, both in the manner as hereinbefore described. (Refer to "Disc Holding Mechanism" and "Disc Loading And Unloading Mechanism", respectively.)

The movement of the slider 32 from the first position towards the second position causes the pivotable members 17 and 26 to pivot from the engaged position towards the releasing position and from the lifting position towards the lowering position, respectively, substantially as shown in FIG. 12, in the manner as hereinbefore described. Therefore, that opposed portions of the outer periphery of the video disc VD are respectively freed from the biting unit 16 and the lifting unit 25 so that the video disc VD completely rests on the platform 5.

On the other hand, the conical projection 44a in the disc holder 44 enters the socket 43b in the disc mount 43 through the central opening VDa in the video disc VD. As the conical projection 44a enters the socket 43b, the video disc VD can be exactly positioned on the platform 5 with the central opening VDa aligned with the opening of the socket 43b.

At the time the protective lid PL is completely closed as shown in FIG. 12, the video disc VD becomes firmly held between the disc mount 43 and the disc holder 44, said mount 43 and said holder 44 being magnetically attracted to each other by the magnet 43c with said video disc VD sandwiched therebetween.

After the condition as shown in FIG. 12 has been established, the next procedure to be done is to turn the control knob 53, which has been positioned at the "OFF" position, towards the click stop position in the direction of the arrow. As the control knob 53 is rotated towards said click stop position, the locking lever 49 is pivoted from the unlocked position towards the locked position in the manner as hereinbefore described and, consequently, the tip of the finger 49c is engaged into the locking groove 13b in the protective lid PL to lock the latter in the closed position.

It is to be noted that, unless the protective lid PL is closed, the control knob cannot be rotated from the "OFF" position because the movement of the abutment 49b in the locking lever 49 is hampered by the stopper 51 in the slider 32 then held in the first position. (Refer to "Protective Lid Locking Mechanism".)

The click stop position of the control knob 53 may not be necessary, in which case the control knob 53 is rotated from the "OFF" position towards the "START" position. However, since the rotation of the control knob 53 is also associated with the slidable carriage 57 for the pickup assembly P as hereinbefore described, the employment of the click stop position is advantageous in that the pickup assembly P is, although it has already moved from the rest position, held standstill without being projected into the disc receiving chamber through the cut-out portion 8a in the side wall 8 of the table structure TS at the time said control knob 53 assumes the click stop position. Anyhow, the control knob 53 may, after the protective lid PL has been closed, be rotated from the "OFF" position to the "START" position past the click stop position.

When the control knob 53 is rotated to the "START" position, the pickup assembly is brought to the operative position with the pickup stylus situated immediately above the outermost turn of the groove on the video disc VD. On the other hand, if the control knob 53 is rotated past the "START" position to any desired position substantially intermediate between the "START" position and the "END" position, the pickup stylus is brought to a position immediately above a substantially intermediate turn between the outermost and innermost turns of the spiral groove on the video disc VD. (Refer to "Access Mechanism For Pickup Assembly".)

After the pickup assembly P has been conditioned as hereinabove described, the "PLAY" key 68 is then depressed. Depression of the key 68 energizes the motor M, moves the actuating plate 72 from the inoperative position towards the operative position and pivots the tiltable base 60 from the disengaged position towards the engaged position, substantially simultaneously.

Upon energization of the motor M, the disc mount 43 is driven at a relatively high speed, for example, 1,800 rpm. together with the video disc VD and the disc holder 44. As is well known to those skilled in the art, immediately after the video disc VD is rotated in this way, it hovers on the rotation-induced air cushion above the platform 5. The rotation of the disc mount 43 is also transmitted to the worm gear 83 through the worm gear 81 by means of the transmission shaft 82.

On the other hand, the movement of the actuating plate 72 towards the operative position in response to the depression of the key 68 results in engagement of the worm gear 83 to the larger gear 64 and is also locked in the operative position by the engagement of the hook 75a of the locking lever 75 to the engagement projection 72a in the actuating plate 72. Upon engagement of the worm gear 83 to the larger gear 64, the rotation of the larger gear 64 is transmitted to the slidable carriage 57 for the pickup assembly through the drive pulley 62 coaxial with said larger gear 64 by means of the cable 65 whereby the pickup assembly P is moved from the operative position in a direction opposed to the rest position and towards the disc holding mechanism DH with the pickup stylus scanning from the outermost turn of the spiral groove on the video disc VD towards the innermost turn thereof.

At the same time as the transmission of the rotational force of the worm gear 83 to the larger gear 64, the tiltable base 60 is pivoted from the disengaged position towards the engaged position with the feeler bar 60a resting on the flange 61a on the adjustment screw 61 which has been set to give a predetermined contact pressure between the tip of the pickup stylus and the video disc VD being rotated.

In this way, reproduction of the audio and video information recorded in the spiral groove on the video disc VD is carried out. However, it is to be noted that, in practice, the pickup assembly is not electrically energized until the number of rotation of the video disc VD attains a predetermined value and, in other words, until the rotation of the video disc above the rotation-induced air cushion becomes stabilized. This is possible by the design of the electric circuitry employed in the video disc player.

During the reproduction of the audio and video information with the pickup stylus sequentially scanning the turns of the spiral groove on the video disc VD, the following two procedures can be taken as desired, which will now be described individually.

I. Repeated Reproduction:

If the "REPEAT" key 69 is depressed during the reproduction of the audio and video information, the transmission plate 73, which has been biased to the engaged position, is moved to the disengaged position and is retained in said disengaged position by the engagement of the pawl 79a in the locking arm 79 with the engagement step 73d in the transmission plate 73. During this movement of the transmission plate 73 from the engaged position towards the disengaged position, the worm gear 83 is disengaged from the larger gear 64 on one hand and is engaged to the sector gear 84 to rotate said sector gear 84 clockwise about the pin 85 against the tension spring 86 as viewed in FIGS. 15 and 16.

After the sector gear 84 has been rotated clockwise through a predetermined angle or time depending upon the number of teeth of the sector gear 84, the release finger 84a in said sector gear 84 is engaged to the barrier 79b in the locking arm 79, thereby causing the latter to pivot against the tension spring 80 with the pawl 79a disengaging from the engagement step 73d. Upon this disengagement of the pawl 79a from the engagement step 73d, the transmission plate 73 is returned to the engaged position with the worm gear 83 again engaged to the larger gear 64.

The repeated reproduction is available only during the period in which the sector gear 84 is driven by the worm gear 83 in the manner as hereinbefore described.

At the same time as the movement of the transmission plate 73 towards the engaged position, the key 69 is returned to the original position from the depressed position.

II. Stop Operation

If the "STOP" key 70 is depressed, the hook 75a in the locking lever 75 disengages from the engagement projection 72a in the actuating plate 72 and, therefore, the actuating plate 72 is biased to the inoperative position together with the transmission plate 73 whereby the worm gear 83 is disengaged from the larger gear 64. At the same time, the motor M, which is made to be energized in response to the depression of the key 68 and so long as said key 68 is locked in the depressed position, is deenergized with the key 68 returning back to the original position from the depressed position. Simultaneously with the return of the actuating plate 72, the tiltable base 60 is also returned to the disengaged position with the pickup stylus being consequently separated away from the spiral groove on the video disc VD.

Return of the pickup assembly P back to the rest position past the operative position can be effected by manually rotating the control knob 53 in the direction opposite to the direction of the arrow towards the "OFF" position.

In any event, at the time the pickup stylus enters the innermost turn of the spiral groove on the video disc VD, the control knob 53 is rotated to the "END" position in the direction of the arrow. No sooner than the control knob 53 is rotated to said "END" position, the release pin (not shown) secured to the undersurface of the gear 55 meshed to the larger gear 64 through the smaller gear 63 abuts the feeler 75b in the locking lever 75, causing the latter to pivot against the tension spring 80 with the hook 75a disengaging from the engagement projection 72a. Thus, the actuating plate 72 is returned to the inoperative position accompanying the return of the key 68 from the depressed position to the original position and the return of the tiltable base 60 from the engaged position back to the disengaged position. Simultaneously therewith, the motor M become deenergized.

The final procedure to be done is to remove the video disc VDs resting on the platform 5, out of the disc receiving chamber of the video disc player. In order to do this, what is required is to rotate the control knob 53 from the "END" position back to the "OFF" position past the "START" position.

During this procedure, as the control knob 53 is rotated from the "END" position back towards the "START" position, the slidable carriage 57 for the pickup assembly P is pulled in a direction away from the cut-out portion 8a in the side wall 8 of the table structure 8 with the pickup assembly P approaching the rest position. Further rotation of the control knob 53 past the "START" position and then the click stop position towards the "OFF" position, the release pin 55a on the gear 53 coaxial with the control knob 53 is trapped into the engagement groove 49a of the locking lever 49 then positioned in the locked position.

Still further rotation of the control knob 53 past the click stop position back towards the "OFF" position results in the pivotal movement of the locking lever 49 from the locked position towards the unlocked position with the tip of the finger 49c disengaging from the locking groove 13b in the protective lid PL.

At the time the control knob 53 is completely returned to the "OFF" position, the pickup assembly P is returned to its rest position on one hand and the protective lid PL is released from its closed position in readiness for opening of the protective lid PL.

Thereafter, the protective lid PL is pivoted to the opened position. During the opening of the protective lid PL, the disc holder 44 is forcibly separated from the disc mount 43 against the magnetic attraction and simultaneously therewith, the slider 32 is moved towards the first position with the pivotable member 26 gradually brought to the lifting position. At the same time, the pivotable member 17 is also pivoted towards the biting position and, however, the movement of the pivotable member 17 towards the biting position serves no purpose.

At the completion of the movement of the pivotable member 26 to the lifting position, the lifting head 29a upwardly shifts the outer peripheral portion of the disc VD with said portion of said disc resting on the contact face 29b of said lifting head 29a, as shown in FIG. 13.

After the protective lid PL has completely been opened, the empty envelope J can subsequently be inserted into the disc receiving chamber. With particular reference to FIG. 13, as the front end of the empty envelope J enters the entrance leading to the disc receiving chamber, the opposed corner portions of the first plate member 1 adjacent the front end thereof are slid over the slopes 10g and onto the stages 10e while the front end portion of the second plate member 2 moves on the flat area 10d and the result is that the gap between the first and second plate members 1 and 2 at the front end of the envelope J is substantially enlarged.

No sooner than the inclined edges 2b at the front end of the second plate member 2 ride over the slopes 10f, the front end of the first plate member 1 has already been overriden the outer peripheral edge of the video disc VD in such a manner as shown in FIG. 13 while the front end of the second plate member 2 is situated beneath said outer peripheral edge of the video disc VD.

Figure 14:
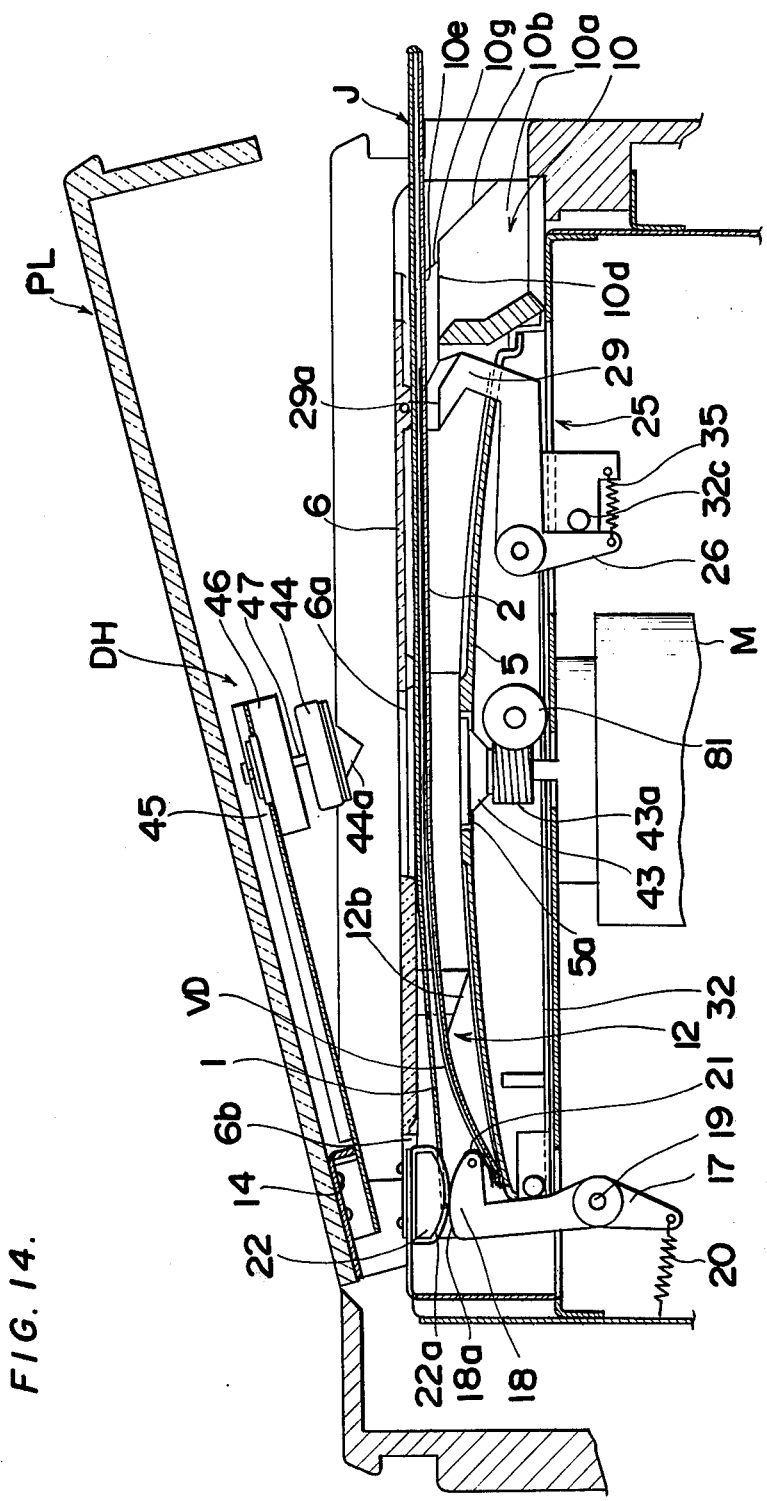

Further insertion of the empty envelope J through the entrance into the disc receiving chamber results in the insertion of the video disc VD into the envelope chamber of the envelope J substantially as shown in FIG. 14. It is to be noted that, shortly before the empty disc envelope J is completely inserted into the disc receiving chamber with the video disc entering into the envelope chamber of the disc envelope J, the opposed corner portions at the front end of the first plate member 1 ride onto the benches 11 and 12 in the same manner as hereinbefore described in connection with the loading of the video disc. At this time, as best shown in FIG. 14, the front end portion of the second plate member 2 of the disc envelope J is substantially sharply downwardly deflected because the outer peripheral portion of the video disc is depressed by the biting head 18 in contact with the roll element 21. It now comes the time when the roll element 21 performs its function which will now be described.

Assuming that the roll element 21 is not used, there will be a great possibility that, after a repeated number of alternate loading and unloading of the video disc with respect to the video disc player, at least an outer peripheral portion of the grooved surface of the video disc, which has frequently contacted the tip of the biting head 18, is worn out while showing a trace of such repeated contact. This is undesirable because some of turns of the information carrier groove on the video disc adjacent the outer periphery thereof become defective.

The employment of the roll element 21 avoids this possibility. Specifically, starting from the condition as shown in FIG. 14, as the disc envelope J is pulled in the direction opposite to the direction of insertion, the front end portion of the second plate member 2, which is downwardly deflected in the manner as shown, moves close to the first plate member 1 by the effect of its own elasticity. At this time, while the video disc VD moves in contact with the roll element 21 while supported by the second plate member 2, the roll element 21 rotates to allow that portion of the video disc to be separated therefrom. Accordingly, it is clear that no substantial frictional resistance is imposed by the roll element 21 on that portion of the video disc VD.

In this way, the video disc envelope J with the video disc VD accommodated therein can be smoothly drawn out of the disc receiving chamber of the video disc player, thus completing one cycle of operation of the video disc player embodying the present invention.

Figure 19:
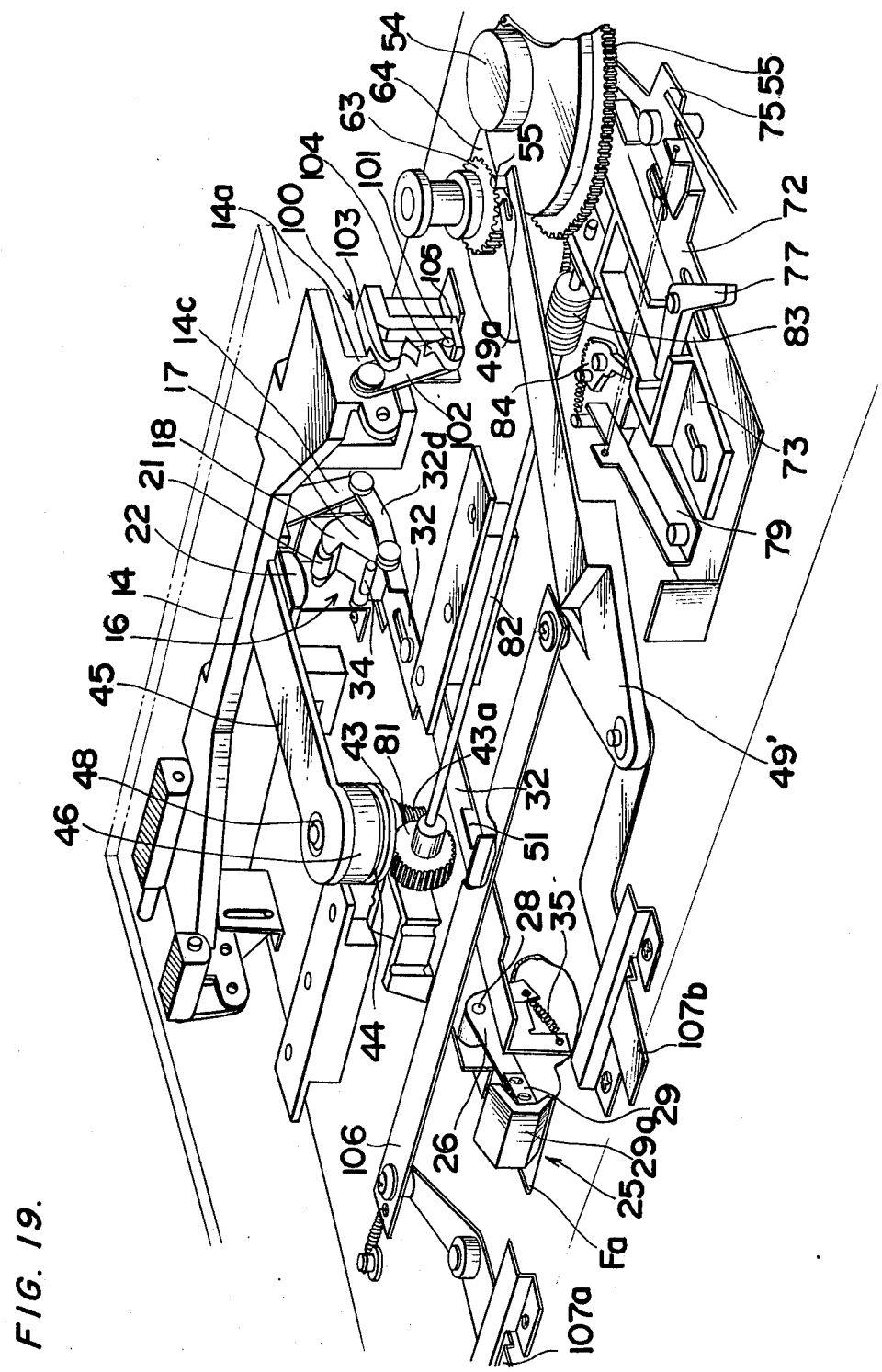
FIG. 19 is a perspective view, illustrating a further embodiment of the present invention wherein a modified form of lid locking mechanism is employed.

It is to be noted that, although not shown and not described hereinbefore, a detent device is in practice used to halt the protective lid PL in the opened position, which detent device may be of a construction similar to that shown in FIG. 19. It is also to be noted that, during the engagement of the worm gear 83 to the larger gear 64, the control knob 53 cannot substantially be rotated manually in either direction because of the load imposed thereon from the worm gear 83 being rotated.

ALTERNATIVE EMBODIMENT OF FIGS. 17 & 18

Figure 17:
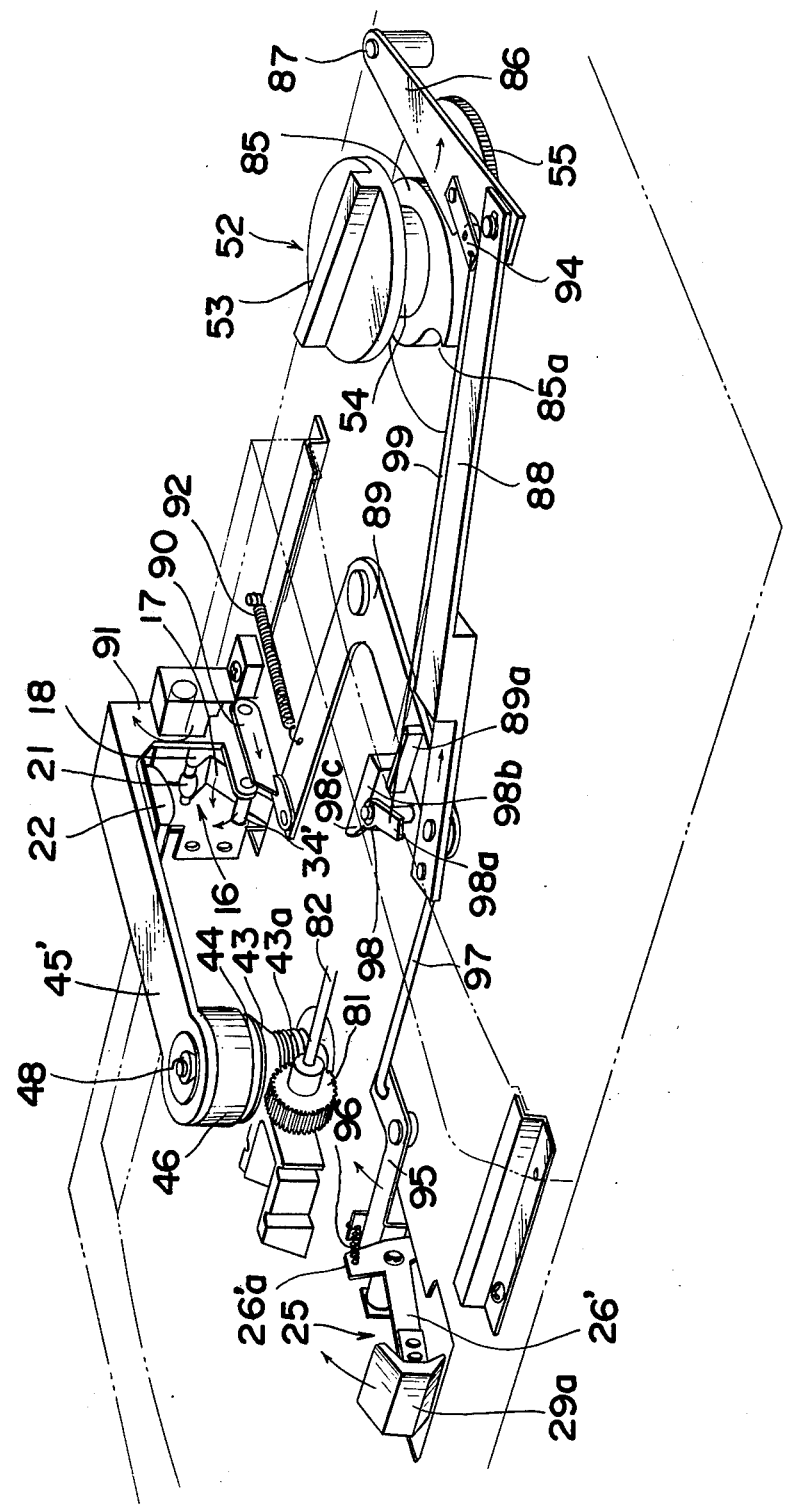
FIG. 17 is a perspective view, illustrating another embodiment of the present invention wherein the disc holding mechanism, the disc catching assembly and the lifting member are all controllable by a single operating wheel.
Figure 18:
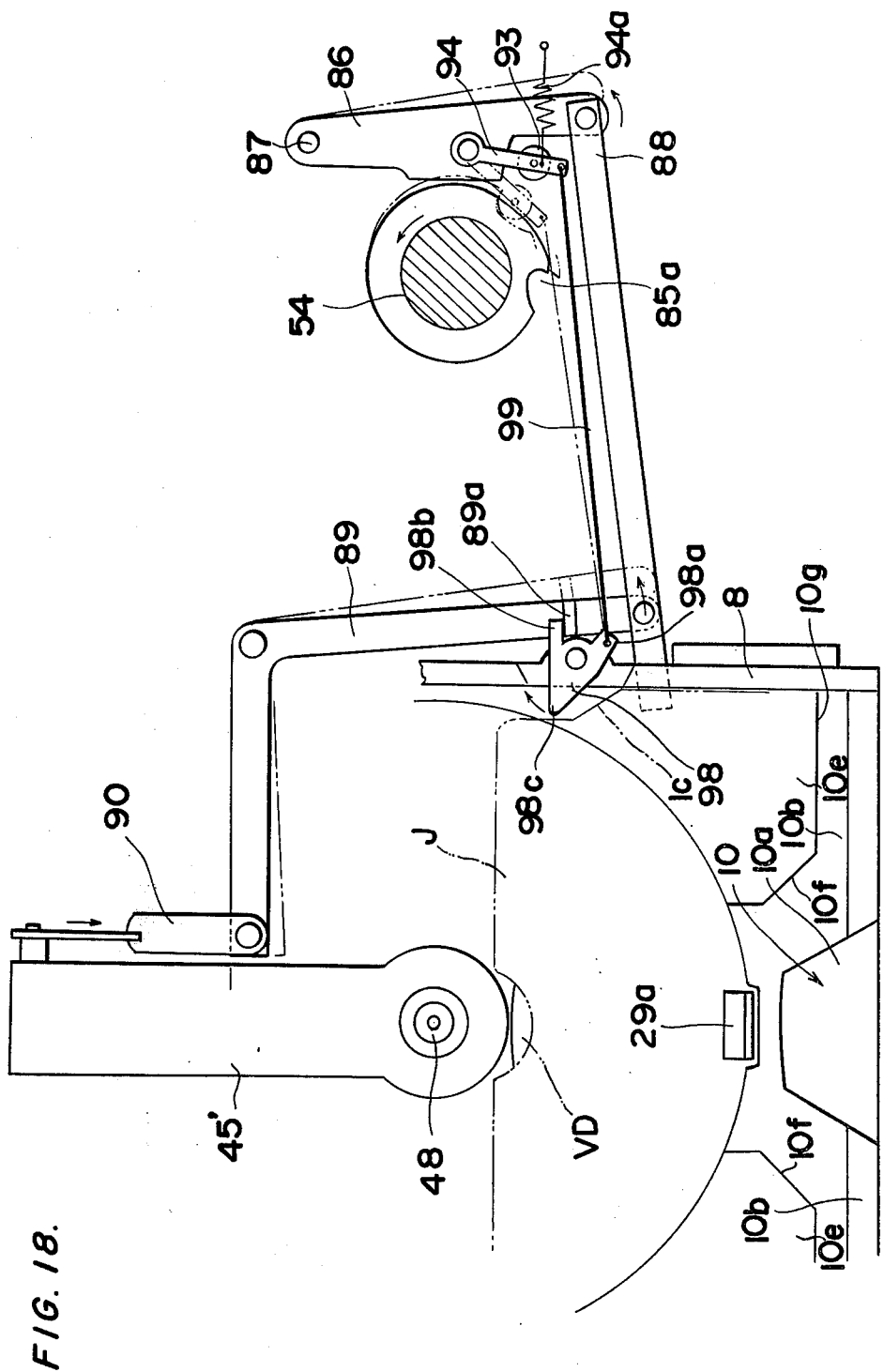
FIG. 18 is a top plan view of FIG. 17.

In the foregoing embodiment of FIGS. 3 to 16, separate and independent operating procedures have been required in manipulating the disc holder 44 through the protective lid PL and the control knob 53. In the embodiment of FIGS. 17 and 18 which will now be described this inconvenience is substantially eliminated.

To this end, referring now to FIGS. 17 and 18, the gear 55 has an upper surface integrally formed with an eccentric cam 85 of a shape as will be described later.

The control knob assembly 52 is operatively associated both with the disc biting unit 16 and also with the disc lifting unit 25 by way of a linkage system which comprises an operating lever 86 having one end pivotally mounted on the framework by a mounting pin 87 and the other end pivotally connected to an intermediate lever 88. The intermediate lever 88 is in turn pivotally connected to a substantially L-shaped lever 89. The L-shaped lever 89 has one end pivotally connected to said intermediate lever 88 and the other end operatively coupled to the disc holder 44, in a manner as will be described later, by means of a connecting bar 90.

As best shown in FIG. 17, an elongated bar 45' corresponding to the elongated bar 45 of the foregoing embodiment is shown as having one end carrying the disc holder 44 through the carrier 46 and the other end integrally formed with a substantially L-shaped leg 91. The leg 91 has one end integral with said other end of said elongated bar 45' and the other end extending in substantially parallel to and below the elongated bar 45' in a direction towards the disc holder 44. An operating pin 34', corresponding to the operating pin 34 of the foregoing embodiment, is rigidly carried by said leg 91 at a portion adjacent the tip of said leg 91 and is adapted to engage the pivotable member 17 so that, when the disc holder 44 is engaged to the disc mount 43 as shown in FIG. 17, the pivotable member 17 is pivoted against the spring 20 to the releasing position and, when the disc holder 44 is separated from the disc mount 43, the pivotable member 17 is brought to the biting position.

The connecting bar 90 referred to above has one end pivotally connected to the L-shaped lever 89 and the other end pivotally connected to that portion of the leg 91 which corresponds in position to the bent of the shape of a figure "L". A spring element, such as a tension spring 92, is used to ultimately bias the operating lever 86 about the pin 87 towards the eccentric cam 85 to which said operating lever 86 is so biased with a lateral side portion thereof constantly held in sliding engagement with the periphery of said cam 85 as shown in FIG. 17.

In the eccentric cam 85, a detent recess 85a is formed at a position where the difference between the maximum radius and the minimum radius of the eccentric shape of said cam 85 exists, which detent recess 85a is adapted to receive therein a roll element 93 as best shown in FIG. 18. The roll element 93 is rotatably carried by the operating lever 86 by means of a support member 94 pivotally mounted on said lever 86.

For operating the lifting unit 25 in synchronism with the biting unit 16 in the manner which has already been described in connection with the foregoing embodiment, a pivotable member 26', corresponding to the pivotable member 26 in the foregoing embodiment, has one end mounted with the lifting head 29a and the other end integrally formed with a foot 26'a through which said pivotable member 26' is connected to an actuating lever 95 through a tension spring 96. The tension spring 96 corresponding in function to the tension spring 35 of the foregoing embodiment is capable of exerting a pulling force selected in consideration of similar requirements to that for said tension spring 35.

The actuating lever 95 is in turn coupled to said other end of the intermediate lever 88 through a connecting rod 97. Therefore, it is clear that, when the operating lever 86 is pivoted in the direction of the arrow in accordance with the rotation of the eccentric cam 85 in the direction of the arrow, the intermediate lever 88 moves in the direction of the arrow, the result of which is that the actuating lever 95 is pivoted in a clockwise direction, as viewed in FIG. 17 and indicated by an arrow, and consequently the pivotable member 26' is moved to the lifting position as pulled by the tension spring 96. Simultaneously therewith, the L-shaped lever 89 is pivoted in a counterclockwise direction, as viewed in FIGS. 17 and 18, towards a position indicated by the broken line.

Operatively coupled to the support member 94 by means of a connecting rod 99 is a substantially Y-shaped shape locking member 98 having three fingers 98a, 98b and 98c integrally formed therein. This locking member 98 is pivotally mounted on the side wall 8 of the table structure TS with the finger 98c projecting into the disc receiving chamber in position ready to engage with the envelope J being inserted as will be described in more detail later. The finger 98a is coupled to said support member 94 through said connecting rod 99 and the finger 98b is adapted to engage a stopper 89a rigidly mounted on the L-shaped lever 89.

The locking member 98 of the construction as hereinabove described is biased counterclockwise by the tension spring 94a, a pulling force of which is transmitted thereto from the support member 94 through the connecting rod 99.

The eccentric cam 85 is so shaped as to permit the system to operate in the following manner. In other words, as the control knob 53 is rotated in the direction of the arrow towards the click stop position from the "OFF" position in which condition the elements 86, 88 and 89 substantially assume the position indicated by the solid line in FIG. 18, the operating lever 86 is pivoted in the counterclockwise direction against the biasing force of the tension spring 92, accompanying the counterclockwise rotation of the L-shaped lever 89 so that the stopper 89a on said lever 89 can disengage from the finger 98b of the locking member 98. This takes place when the lateral side portion of the lever 86 which is slidingly engaged to the periphery of said cam 85 contacts that point on the periphery of the cam 85 which is spaced from the axis of rotation of the shaft 54 a distance corresponding to the maximum radius of the shape of said cam 85 as shown by the broken line in FIG. 18. At this time, the detent recess 85a is brought into a position ready to receive the roll element 93.

During this condition, when the disc envelop J is inserted, the front of the envelope J is engaged to the finger 98c, as shown by the broken line in FIG. 18, causing the locking member 98 to pivot clockwise against the biasing force applied thereto. Upon clockwise rotation of the locking member 98 in response to insertion of the envelope J, the roll element 93 become engaged into the detent recess 85a and, therefore, the disc holder 44 is retained in an upwardly shifted position. On the other hand, during the same condition, the pivotable member 17 and 26' are respectively moved to the biting and lifting positions substantially as shown in FIGS. 10 and 11 or FIGS. 13 and 14.

Further rotation of the control knob 53 from the click stop position towards the "START" position results in engagement of the lateral side portion of the operating lever 86 to that portion of the periphery of the eccentric cam 85 which is spaced from the axis of rotation of the shaft 54 a distance corresponding to the minimum radius of the shape of said cam 85. However, it is to be noted that this further rotation of the control knob 53 cannot be achieved, so long as the disc envelope J remains unremoved within the disc receiving chamber, because the roll element 93 is engaged in the detent recess 85a thereby locking the control knob 53 in the click stop position. In other words, this further rotation of the control knob in the direction of the arrow is possible only when the envelope J is not present within the disc receiving chamber.

Simultaneously with the rotation of the control knob 53 to the "START" position, the disc holder 44 is completely engaged to the disc mount 43 and the pivotably members 17 and 26' are respectively pivoted to the releasing and lowering positions.

Thereafter, the "PLAY" key 68 is ready to be depressed. If this has been done, the control knob 53 is rotated from the "START" position towards the "END" position in a manner similar to that has already been described in connection with the foregoing embodiment. However, in view of the fact that the direction of rotation of the control knob 53 in the embodiment of FIGS. 3 to 16 and that in the embodiment of FIGS. 17 and 18 are opposite to each other, it is to be understood that the gear 55 in the embodiment of FIGS. 17 and 18 is meshed to the smaller gear 63 (FIGS. 15 and 16) through an intermediate gear (not shown) disposed therebetween.

Assuming that the control knob 53 has arrived at the "END" position, what is necessary is to manually rotate the control knob 53 in a direction opposite to the direction of the arrow and it is clear that the operation takes place in the reverse manner. Specifically, the roll element 93 is clear of the periphery of the eccentric cam 85 so long as the disc envelope J is not inserted into the disc receiving chamber.

It is to be noted that the protective lid PL is, in the embodiment of FIGS. 17 and 18, to be understood as employed separately of the elongated bar 45'. However, depending on the design as desired, the bar 45' may be rigidly secured to the protective lid PL in the manner as hereinbefore described with reference to FIGS. 3 to 16.

ALTERNATIVE EMBODIMENT OF FIG. 19

In the embodiment shown in FIG. 19, the necessity of the linkage system shown by 36 in FIG. 7 is substantially eliminated. In accomplishing this object, that end of the slider 32 adjacent the biting unit 16 is pivotally coupled to the lid support 14 through a connecting bar 32d. As shown, the protective lid support has a leg 14c having one end rigidly secured to, or otherwise integrally formed with, said support 14 and terminating adjacent the framework F. On the other hand, the connecting bar 32d has one end pivotally coupled to the other end of said leg 14c and the other end pivotally coupled to that end of the slider 32.

The detent device for retaining the protective lid PL in the opened position and also in the closed position is indicated by 100. This detent device 100 comprises a pin member 101 rigidly mounted on a plate member 102 which is in turn pivotally connected to the lug 14a of the support 14. This pin member 101 is engaged in any of upper and lower detent recesses respectively defined by shaped leaf springs 103 and 104 in cooperation with a common support pieces 105 by which said springs 103 and 104 are supported as shown.

The detent device 100 of the construction as hereinabove described is designed such that, when the protective lid PL is to be opened, the pin member 101 which has been engaged in the lower detent recess upwardly shifts while expanding the leaf spring 104. At this time, the plate member 102 pivots counterclockwise as viewed in FIG. 19. At the time the protective lid PL has been opened, the pin member 101 is engaged and retained in the upper detent recess. Closure of the protective lid PL causes the pin member 101 to operate in a reverse manner.

Furthermore, for locking the protective lid PL in the closed position, the lid locking mechanism may have more than one finger 49c. In such case, while the flap 13a of the protective lid PL is provided with another slot similar to and in addition to the slot 10i (FIGS. 8 and 9), the locking lever 49' is constructed in a manner as will now be described.

The locking lever 49' has one end formed with the engagement recess 49a as hereinbefore described in connection with the embodiment of FIGS. 3 to 16 and the other end pivotally connected to an intermediate link bar 106 which is in turn pivotally connected to a finger member 107a. Another finger member 107b is pivotally connected to a substantially intermediate portion of the locking lever 49' which corresponds in position to the bent of the shape of a figure "L" assumed by said lever 49'. It is to be noted that the lever 49' is pivotally mounted on the framework at that portion thereof where said lever 49' is pivotally connected with the intermediate link bar 106. In order to avoid the possibility that the protective lid PL can be opened during the operation of the video disc player, the stopper 51 on the slider 32 is adapted to engage a substantially intermediate portion of the intermediate link bar 106.

It is to be noted that the protective lid locking mechanism shown in FIG. 19 can equally be applicable to the embodiment of FIGS. 3 to 16 and need not be always incorporated in the embodiment of FIG. 19.

ALTERNATIVE EMBODIMENT OF FIG. 20

In any of the foregoing embodiments of FIGS. 3 to 19, the disc lifting unit 25 has been required, in view of the construction of the table structure and, particularly, the porch 10, for allowing the video disc VD, which has been accommodated within the disc receiving chamber and has rested on the platform 5, to be received into the disc envelope J immediately after the latter has been inserted through the entrance into the disc receiving chamber. According to the embodiment shown in FIG. 20, the disc lifting unit is shown, however, necessary. For this purpose, the porch 10 is constructed in a manner quitely different from that employed in any of the foregoing embodiments and in a manner as will now be described with reference to FIG. 20.

While the level of the flat area 10d in the porch 10 of the table structure TS in any of the foregoing embodiments lies above that portion of the platform 5 which is aligned with the entrance leading to the disc receiving chamber and which is substantially positioned between the stages 10e, the level of the flat area 10'd in the porch 10 of the table structure TS in the embodiment of FIG. 20 lies below same portion of the platform 5 and, therefore, there is formed a slope 10j at the step between said level of said flat area 10'd and that portion of the platform 5. This slope 10j is so inclined that, as the disc envelope J is inserted through the entrance with the inclined edges 2b at respective side corners of the front end of the second plate member 2 of said disc envelope J sliding over the associated slopes 10f, said front end of said second plate member 2 slides over said slope 10j. The position of said slope 10j is so selected that an outer peripheral portion of the video disc VD projects outwardly from the uppermost ridge of said slope 10j and substantially overhangs a portion of the porch 10 which is located between the root of said slope 10j and the flat area 10'd.

Figure 20:
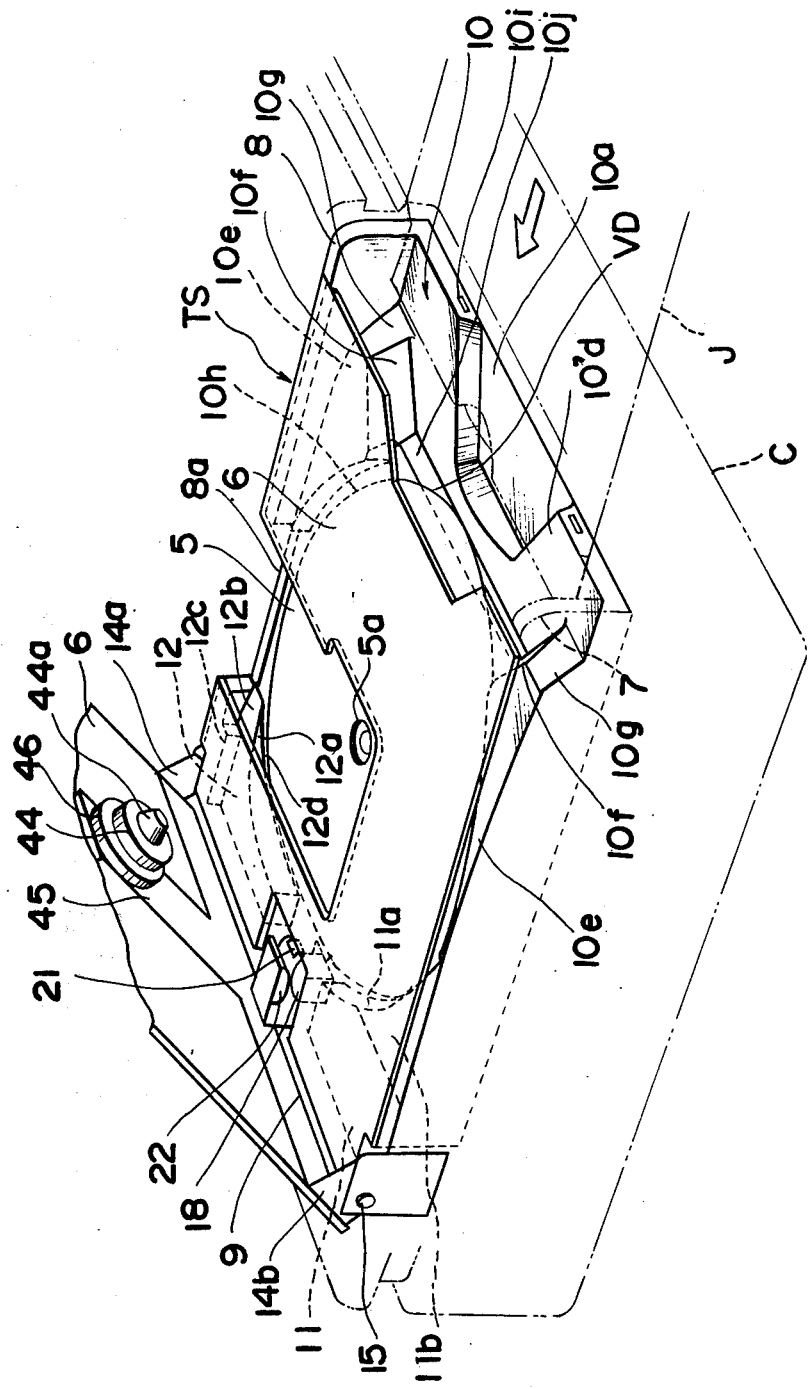
FIG. 20 is a perspective view of a portion of the video disc player wherein a modified form of table arrangement is employed.

Except for the difference, as described above, existing in the manner as to how the video disc VD resting on the platform 5 is received into the disc envelope J, the table structure TS according to the embodiment of FIG. 20 functions satisfactorily in a manner substantially similar to that according to any of the embodiments of FIGS. 3 to 16, FIGS. 17 and 18 and FIG. 19.

OTHER CHANGES AND MODIFICATIONS

In describing the embodiments of FIGS. 3 to 16 and FIG. 19, the protective lid PL has been described as rigidly mounted on the lid support 14. Unlike this arrangement, the protective lid PL may be hinged to the cabinet in a manner separate of the lid support 14, in which case the protective lid may be of a size sufficient to overhang not only above the top panel 6, but also above the control knob 53 and the keys 68 to 70.

In addition thereto, further changes and modifications are apparent to those skilled in the art upon reading of the description of the present invention with or without reference to the accompanying drawings. Therefore, these changes and modifications are to be construed as included within the true scope of the present invention unless they depart therefrom.

What is claimed is:

1. A video disc player utilizable with a flexible foil-type information carrier disc, which disc is accommodated in a disc envelope of a type comprising first and second flexible plate members secured together to provide an opening leading to an envelope chamber defined therebetween, at least an outer peripheral portion of said disc being exposed to the outside from said envelope through the opening of said envelope, said video disc player comprising:

means for driving said information carrier disc at its center at a relatively high speed in one direction;

means including a disc holder and a disc mount, said disc mount being coupled to said driving means for rotation together therewith;

means for supporting said disc holder, said supporting means being movable between first and second positions, said disc holder when said support means is in said second position cooperating with said disc mount to firmly hold said disc between said disc mount and said disc holder and being rotatable independently of said supporting means, but rotatable together with said disc mount, said disc holder when said supporting means is in said first position separating from said disc mount;

a table structure including a disc receiving chamber and a stationary platform within said disc receiving chamber, said stationary platform having a central opening through which said disc mount slightly outwardly projects to allow said disc to hover on a rotation-induced air cushion above said stationary platform during rotation of said disc sandwiched between said disc mount and said disc holder, said table structure having an envelope inlet and a passage means leading from said envelope inlet to said disc receiving chamber and substantially above said platform;

means in said disc receiving chamber operatively positioned in opposition to said envelope inlet and including fixed and movable members for holding said exposed outer peripheral portion of said disc when said exposed outer peripheral portion of said disc accommodated within said evenlope is engaged in between said fixed and movable members upon complete insertion of said envelope with said disc therein into said disc receiving chamber such that, when said envelope is subsequently pulled in a direction opposite to the direction of insertion of said envelope in readiness for removal of the envelope in relation to said disc, said disc is drawn out of said envelope being pulled, said movable member being supported in position for movement between first and second positions and operatively associated with said supporting means whereby, when said supporting means is in said second position, said movable member is brought to its said second position thereby releasing said exposed outer peripheral portion of said disc to permit the latter to fall flat against the stationary platform, said disc holder being subsequently engaged to said disc mount with said disc sandwiched therebetween when said supporting means is moved to said second position; and said passage means including first means positioned adjacent said holding means and second means positioned adjacent said envelope inlet of said table structure, said first means being operable to allow said exposed outer peripheral portion of said disc to be substantially engaged in between said fixed and movable members without being disturbed by said disc envelope during loading of the disc in said video disc player, and said second means being operable to substantially upwardly shift the front end portion of the first plate member of said envelope in relation to said front end portion of the second plate member of said envelope thereby allowing another outer peripheral portion of the disc, which has been accommodated within the disc receiving chamber, to be inserted into the envelope during insertion of the empty envelope into the disc receiving chamber in readiness for removal of the disc from the disc receiving chamber into the envelope.

2. A video disc player as claimed in claim 1, further comprising means for biasing said movable member to said first position of said movable member, said movable member when in said first position being ready to cooperate with said fixed member to allow said exposed outer peripheral portion of said disc to be subsequently enaged in therebetween.

3. A video disc player as claimed in claim 1, further comprising shifting means operatively supported for movement between lifting and lowering positions and located in opposite and spaced relation to said holding means with said stationary platform located between it and said holding means, said shifting means being operatively associated with either one of said supporting means and said movable member of said holding means such that, when said supporting means is in said first position, said shifting means is brought to said lifting position thereby facilitating insertion of said another outer peripheral portion of said disc into the envelope chamber during insertion of the empty envelope into the disc receiving chamber, said shifting means being brought to said lowering position, when said supporting means is moved to said second position, said shifting means in said lowering position being completely clear of the video disc which has rested on the stationary platform.

4. A video disc player as claimed in claim 1, wherein said table structure comprises a pair of opposed side walls positioned on respective sides of said stationary table in parallel relation to each other, a rear wall having both ends joined to respective ends of said side walls and positioned rearwardly of said holding means with respect to the envelope inlet, said disc receiving chamber being defined by a space substantially surrounded by said side and rear walls and a top panel, said envelope inlet being defined between other ends of said side walls and below said top panel, and wherein said supporting means comprises a hingedly supported protective lid having a top covering and a flap, said top covering and flap, when said protective lid is in said second position, substantially overhanging said top panel and substantially closing said envelope inlet, respectively, said disc holder being carried by said top covering of sad protective lid and being engaged to said disc mount when said protective lid is brought to said second position.

5. A video disc player as claimed in claim 4, further comprising shifting means operatively supported in position for movement between lifting and lowering positions and located in opposite and spaced relation to said holding means with said stationary platform located between it and said holding means, said shifting means being operatively associated with either one of said protective lid and said movable member of said holding means such that, when said protective lid is in said first position, said shifting means is brought to said lifting position thereby facilitating insertion of said another outer peripheral portion of said disc into the envelope chamber during insertion of the empty envelope into the disc receiving chamber, said shifting means being brought to said lowering position when said protective lid is moved to said second position, said shifting means in said lowering position being completely clear of the video disc which has rested on the stationary platform.

6. A video disc player as claimed in claim 4, further comprising a linkage means interposed between said protective lid and said movable member of said holding means for moving said movable member from said first position to said second position in response to the movement of said protective lid from said first position to said second position.

7. A video disc player as claimed in claim 5, further comprising a linkage means for linking said protective lid and any of said movable member and said shifting means, wherein said movable member and said shifting means are responsive to said protective means and said linkage means are operable so as to move said movable member from said first position to said second position and said shifting means from said lifting position to said lowering position simultaneously in response to the movement of said protective lid from said first position to said second position.

8. A video disc player as claimed in claim 4, further comprising means for locking said protective lid in said second position during the operation of the video disc player.

9. A video disc player as claimed in claim 1, further comprising means accessible to an operator of the video disc player for selectively moving said supporting means between said first and second positions.

10. A video disc player as claimed in claim 4, further comprising means accessible to an operator of the video disc player for selectively moving said protective lid between said first and second positions.

11. A video disc player as claimed in claim 8, further comprising means accessible to an operator of the video disc player for selectively moving said protective lid between said first and second positions and wherein said locking means is operatively associated with said selectively moving means such that said locking means locks said protective lid in said second position during the movement of said protective lid from said first position towards said second position.

* * * * *